(12) United States Patent
Zhang et al.

(10) Patent No.: US 8,161,008 B2
(45) Date of Patent: Apr. 17, 2012

(54) INFORMATION PROCESSING APPARATUS AND OPERATION METHOD THEREOF

(75) Inventors: Xuerui Zhang, Yokohama (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 651 days.

(21) Appl. No.: 12/326,943

(22) Filed: Dec. 3, 2008

(65) Prior Publication Data

US 2010/0088279 A1 Apr. 8, 2010

(30) Foreign Application Priority Data

Oct. 6, 2008 (JP) .................................. 2008-260037

(51) Int. Cl.
*G06F 17/30* (2006.01)
(52) U.S. Cl. ........................................ 707/654
(58) Field of Classification Search .................. 707/737, 707/758, 654, 661
See application file for complete search history.

(56) References Cited

U.S. PATENT DOCUMENTS

| | | | | |
|---|---|---|---|---|
| 6,643,795 | B1 * | 11/2003 | Sicola et al. | 714/6.21 |
| 6,691,245 | B1 * | 2/2004 | DeKoning | 714/6.31 |
| 7,082,506 | B2 * | 7/2006 | Nakano et al. | 711/162 |
| 7,114,094 | B2 * | 9/2006 | Soejima | 714/6.3 |
| 7,275,138 | B2 * | 9/2007 | Saika | 711/154 |
| 2007/0162716 | A1 * | 7/2007 | Yagisawa et al. | 711/162 |
| 2007/0271429 | A1 * | 11/2007 | Eguchi et al. | 711/162 |

FOREIGN PATENT DOCUMENTS

JP 2006-119688 5/2006
JP 2007-310631 11/2007

* cited by examiner

*Primary Examiner* — Angela M Lie
*Assistant Examiner* — Fatima Mina
(74) *Attorney, Agent, or Firm* — Antonelli, Terry, Stout & Kraus, LLP.

(57) ABSTRACT

An information processing apparatus includes a remote copying processing part 214 copying, at predetermined time intervals, difference data of a D-VOL 72 onto a different D-VOL 72 via a communication interface; and a failover processing part 215 acquiring the number of other auxiliary volumes 74 provided to be added to the different D-VOL 72 as a new D-VOL 72 when the copying of the difference data of the D-VOL 72 onto the different D-VOL 72 is complete, comparing the number of other auxiliary volumes 74 with the number of auxiliary volumes 74 included in itself, and performing a failover process of switching a function of a copy source of a data copying process by the data copying processing part to a function of a copy destination thereof when the number of other auxiliary volumes 74 is larger than the number of that in itself by a predetermined value or more.

9 Claims, 29 Drawing Sheets

FILE MANAGEMENT INFORMATION 310

| | SUPER BLOCK | DIRECTORY ENTRY | i NODE TABLE | DATA BLOCK | |
|---|---|---|---|---|---|
| | 311 | 312 | 313 | 314 | |

FIG. 3A

DIRECTORY ENTRY 312

| DIRECTORY PATH NAME (3121) | i NODE NUMBER (3122) |
|---|---|
| /home/user-01/···/a.txt | 100 |
| /home/user-02/···/b.txt | 200 |
| : | : |

FIG. 3B i NODE TABLE 313

| i NODE NUMBER (3131) | OWNER (3132) | ACCESS RIGHT (3133) | SIZE (3134) | DATA BLOCK ADDRESS 1 (3135) | DATA BLOCK ADDRESS 2 (3136) | DATA BLOCK ADDRESS 3 (3137) |
|---|---|---|---|---|---|---|
| : | : | : | : | : | : | : |
| 100 | user001 | u:gw rxw rxw rxw | 1000KB | 0-100-3 | 3-200-2 | 5-250-5 |
| : | : | : | : | : | : | : |

FIG. 3C

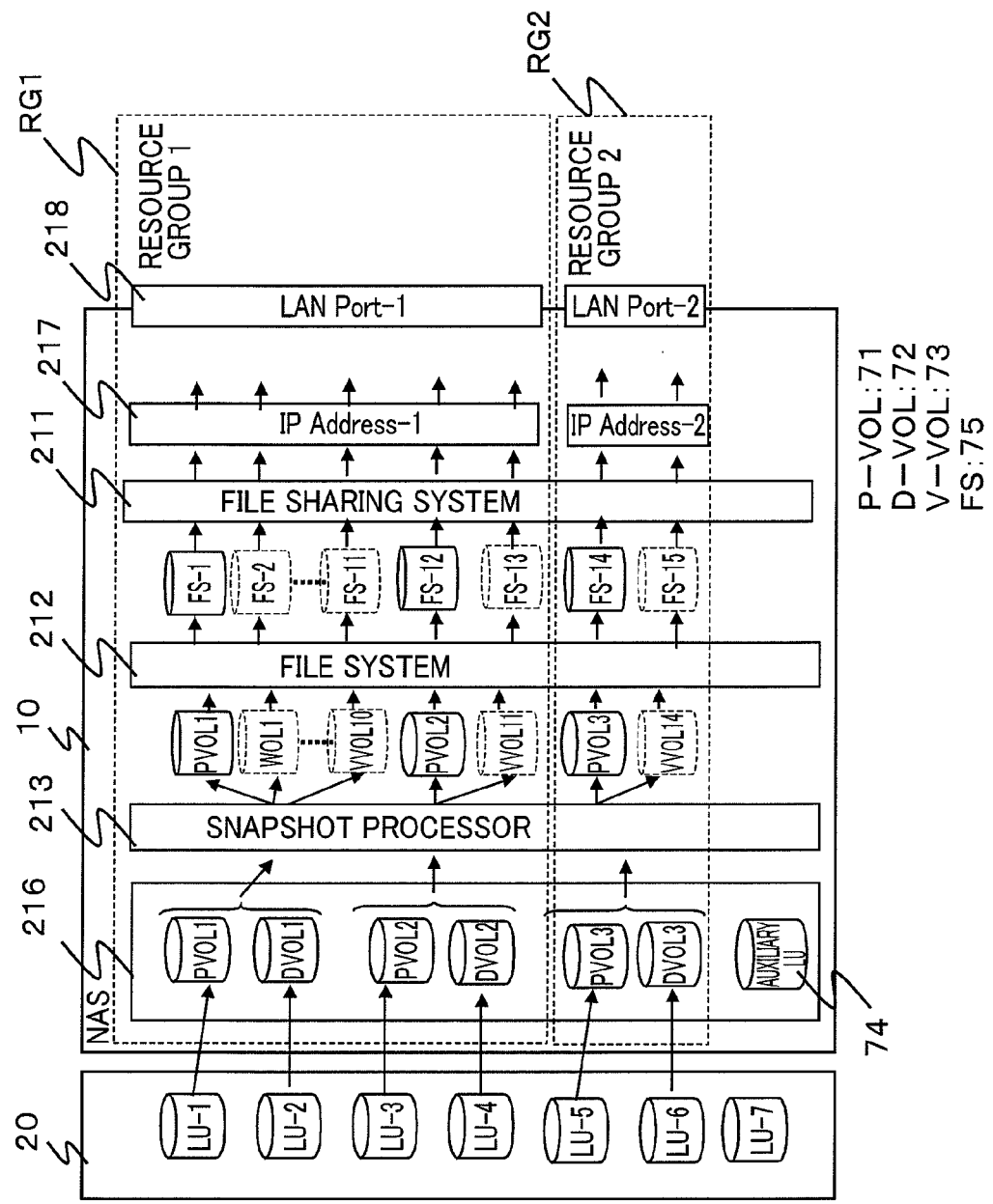

FIG. 6

RG MANAGEMENT TABLE 600

| RG NAME 601 | PRESENT LEVEL 602 | DATE AND TIME OF APPLICATION OF PRESENT LEVEL 603 | TOTAL TIME SPENT AT EACH LEVEL 604 | | | IP ADDRESS ALLOCATED TO RG 605 | FILE SYSTEM NAME INCLUDED IN RG 606 | |
|---|---|---|---|---|---|---|---|---|
| | | | 1 | 2 | 3 | | FS NAME 1 | FS NAME 2 |
| RG-1 | 2 | 2008/7/5 12:00:00 | 10 | 50 | 0 | 192.168.12.34 | FS-1 | – |
| .. | .. | .. | .. | .. | .. | .. | .. | .. |

FILE SYSTEM MANAGEMENT TABLE 700

| FILE SYSTEM NAME 701 | P-VOL NAME AND ASSIGNED LU NAMES 702 | | | D-VOL NAME AND ASSIGNED LU NAMES 703 | | | D-VOL REMAINING AMOUNT 704 |
|---|---|---|---|---|---|---|---|
| FS-1 | P-VOL1 | - | .. | D-VOL1 | - | .. | 50MB |
|  | LU-2 | - | .. | LU-3 | - | .. |  |
| FS-2 | P-VOL2 | .. | .. | D-VOL2 | .. | .. |  |
| .. | .. |  |  |  |  |  | .. |

FIG. 7

AUXILIARY VOLUME MANAGEMENT TABLE
800

| LU NAME | LU SIZE | STATE OF ALLOCATION (ALLOCATED/NOT ALLOCATED) |
|---|---|---|
| LU-1 | 10GB | NOT ALLOCATED |
| LU-2 | 20GB | ALLOCATED |
| LU-3 | 40GB | ALLOCATED |
| ⋮ | ⋮ | ⋮ |

FIG. 8

REMOTE COPY SETTING MANAGEMENT TABLE
900

| RG NAME | PRIMARY SIDE (MAIN SYSTEM) | SECONDARY SIDE (SUB SYSTEM) |
|---|---|---|
| RG-1 | NAS-1 | NAS-2 |
| RG-2 | NAS-2 | NAS-1 |
| ⋮ | ⋮ | ⋮ |

FIG. 9

TABLE FOR SELECTION OF FAILOVER
PROCESS TARGET OF LEVEL-2 PROCESS

| # | RG NAME | DVOL REMAINING AMOUNT (IN ASCENDING ORDER) | TOTAL TIME (LEVEL 3) | TOTAL TIME (LEVEL 2) |
|---|---------|---------------------------------------------|----------------------|----------------------|
| 1 | RG-2    | 25MB                                        | 100H                 | 10H                  |
| 2 | RG-1    | 50MB                                        | 100H                 | 50H                  |
| 3 | :       | 50MB                                        |                      |                      |
| 4 | :       | 150GB                                       |                      |                      |

INFORMATION PROCESSING APPARATUS AND OPERATION METHOD THEREOF

CROSS-REFERENCE TO RELATED APPLICATIONS

The present application claims a priority from Japanese Patent Application No. 2008-260037 filed on Oct. 6, 2008, the content of which herein incorporated by reference.

BACKGROUND OF THE INVENTION

1. Field of the Invention

The present invention relates to an information processing apparatus and an operation method thereof, and more particularly to a technology for securely and continuously performing a data copying process for snapshot difference data while efficiently using storage areas in a copy source and a copy destination.

2. Related Art

One of functions of a storage system is called a snapshot function with which, for a volume in operation (hereinafter, referred to as an "operational volume"), the state at a certain time (hereinafter, the state is referred to as a "snapshot") is provided to a user in response to a request from the user or the like. This snapshot function is generally implemented in such a way that data (hereinafter, referred to as "difference data") for reproducing the snapshot of a operational volume at a certain time are saved in advance in a volume (hereinafter, referred to as a "difference volume") different from the operational volume, and that the snapshot at the certain time is reproduced using the present data of the operational volume and the difference data saved in the difference volume, in response to a request from the user or the like.

Meanwhile, for a certain site such as a data center in which a large amount of data are stored, data duplication has been put into practice in order to reduce or avoid a risk of loosing data due to a disaster or the like. For such data duplication, a different site for providing data storage areas is set up at a place physically distant from the certain site, and the two sites are coupled to each other with a communication network. Then, the data stored in the certain site such as the data center are regularly copied in a storage area in the different site (this data copy process is called a "remote copy" below. In addition, a device or the like on a place where original data are stored is called a "local," and a device or the like on a place where copied data are stored is called a "remote.").

The snapshot described first is also subjected to the remote copy process (e.g., refer to Japanese Patent Application Laid-open Publication No. 2007-310631). One of disclosed technologies to securely perform the remote copy of the snapshot is a technology of preventing a capacity shortage of a difference volume for storing difference data in a copy destination (e.g., refer to Japanese Patent Application Laid-open Publication No. 2006-119688).

For example, when a hardware trouble or the like occurs in a system of a local site, a failover process is performed to continue the operation of the system. In the failover process, the system is automatically switched to a system of a remote site in a predetermined procedure. When the snapshot is copied for a remote copy from the local site to the remote site, a problem sometimes occurs that the capacity of a difference volume differs between the local and remote sites. This is because, for example, when a volume being managed by thin-provisioning of hardware is allocated to the difference volume, and when a dynamic allocation of a storage area cannot be made due to a temporary hardware trouble only a storage area on which an allocation has already been made is capable of being used. This problem occurs, for example, in a case where a volume being managed by thin-provisioning of hardware is allocated to the difference volume. More specifically, in this case, if the storage area cannot be dynamically allocated due to a temporary hardware trouble, the difference volume can use only the storage area already allocated, and thereby may face a shortage of the capacity. When such a capacity shortage occurs in the local site, the capacity of the difference volume may differ between the local and remote sites, and result in a failover.

Further, when an operation for improving the use efficiency of a storage system is performed in a local site, e.g., when a management is made in which data stored in a volume with a large amount of unused area is moved to a volume with a smaller capacity, the capacity of a difference volume may become insufficient due to the moving of the data. In this case, also, the capacity of a difference volume may also differ between local and remote sites, and result in a failover.

To cope with such a shortage of the capacity of the difference volume, a non-allocated auxiliary volume is added as the difference volume. However, the capacity of the auxiliary volume may occasionally differ between the local and remote sites. In this case, there is a problem that in one site that has a smaller capacity of an auxiliary volume than the other site, the auxiliary volume cannot be added as the difference volume.

The capacity of an auxiliary volume differs, for example, due to a hardware trouble. Also, when a local site and a remote site are independently managed and separately undergo addition or the like of volumes, the number of auxiliary volumes may differ between the two sites.

Against this background, the present invention aims to provide an information processing apparatus and an operation method thereof for securely and continuously perform a data copying process for snapshot difference data while efficiently using storage areas in a copy source and a copy destination.

SUMMARY OF THE INVENTION

An aspect of the present invention to solve the above-described and other problems is a provision of an information processing apparatus coupled to a storage apparatus providing a plurality of logical volumes, comprising a file system managing the plurality of logical volumes by allocating the plurality of logical volumes to each P-VOL, each D-VOL and auxiliary volumes that are each additionally allocatable as the D-VOL, the file system being capable of accessing the each P-VOL, the P-VOL used for data input/output with an external device, the D-VOL used for storing difference data generated with update of data in the P-VOL to reproduce a snapshot that is a state of the P-VOL at a certain time; a communication interface with which the external device communicates with the file system; a data copying processing part implemented through executing a corresponding program by a processor of the information processing apparatus, that copies, at predetermined time intervals, the difference data of the D-VOL onto a different D-VOL disposed outside of the storage apparatus via the communication interface; and a failover processing part implemented through executing a corresponding program by a processor of the information processing apparatus, that acquires the number of other auxiliary volumes provided to be added to the different D-VOL as a new D-VOL when the data copying processing part completes a process of copying the difference data of the D-VOL onto the different D-VOL, comparing the acquired number of the other auxiliary volumes with the number of auxiliary volumes of its own, and performs a failover process of switching a function of a copy source in the data copying process by the data copying processing part, to a function of a copy destination thereof when the failover processing part determines that the acquired number of the other auxiliary volumes is larger than the number of auxiliary volumes of its own by a predetermined threshold value or more.

The problems and the solving method therefor disclosed in this application will become apparent in the following embodiments and drawings.

According to the present invention, it is possible to securely and continuously perform a data copying process for snapshot difference data while efficiently using storage areas in a copy source and a copy destination.

BRIEF DESCRIPTION OF THE DRAWINGS

FIG. 3A is an example of file management information 310;

FIG. 3B is an example of directory entry 312;

FIG. 3C is an example of i node table 313;

FIG. 3D is a diagram showing an example of software configurations of the server apparatus 10 and a storage apparatus 20;

FIG. 6 is an example of an RG management table 600;

FIG. 7 is an example of a file system management table 700;

FIG. 8 is an example of an auxiliary volume management table 800;

FIG. 9 is an example of a remote copy setting management table 900;

DETAILED DESCRIPTION OF THE PREFERRED EMBODIMENTS

An embodiment of the present invention will be described below with reference to the accompanying drawings.

Figure 1A:
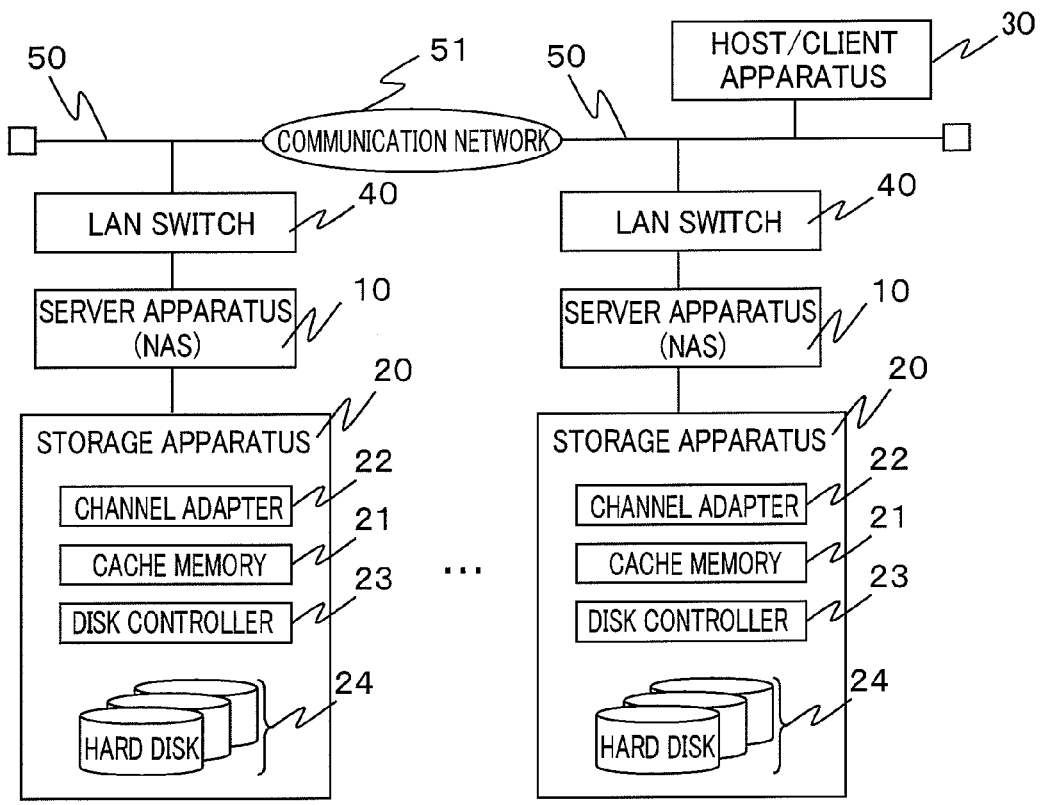
FIG. 1A is a diagram showing hardware of an information processing system 1.

FIG. 1A shows a hardware configuration of an information processing system 1 to be explained as an embodiment. As shown in FIG. 1A, the information processing system 1 includes server apparatuses 10, storage apparatuses 20, a host/client apparatus 30, and LAN switches 40. The host/client apparatus 30 and each of the server apparatuses 10 are coupled to each other via a communication network 50. Two server apparatuses 10 are coupled to each other via a communication network 51. To each server apparatus 10, the storage apparatus 20 is coupled, one of which functions as a local site and the other one of which functions as a remote site, whereby data stored in the storage apparatus 20 are duplicated.

The communication network 50 is, for example, a Local Area Network (LAN). The communication network 51 is, for example, the Internet. The server apparatus 10 and the storage apparatus 20 are coupled, for example, by a Storage Area Network (SAN) constituted by using a fiber channel (not illustrated). Incidentally, the communication network 50 and the communication network 51 are coupled via a communication device such as a router or a switch omitted in the drawing.

The host/client apparatus 30 is, for example, a computer (an information processing system) such as a personal computer or a workstation. In response to a request sent from the host/client apparatus 30, the server apparatus 10 provides the host/client apparatus 30 with a storage area of the storage apparatus 20. In addition, the server apparatus 10 is a Network Attached Storage (NAS) functioning as a file server to the host/client apparatus 30. After receiving an I/O request (a data writing request, a data reading request) sent from the host/client apparatus 30, the server apparatus 10 writes data on or reads data from the storage apparatus 20. Further, the server apparatus 10 transmits a report on the completion of the writing of data or data read out to the host/client apparatus 30, when needed.

The LAN switch 40 is an interface which is provided between the server apparatus 10 being a NAS and the host/ client apparatus 30, and which couples a file-sharing system to be described later to the communication network 50 (LAN). To an IP address allocated to the file-sharing system, a plurality of LAN ports are mapped so that a bandwidth is increased or decreased depending on a load of the IP address or the like.

Figure 1B:
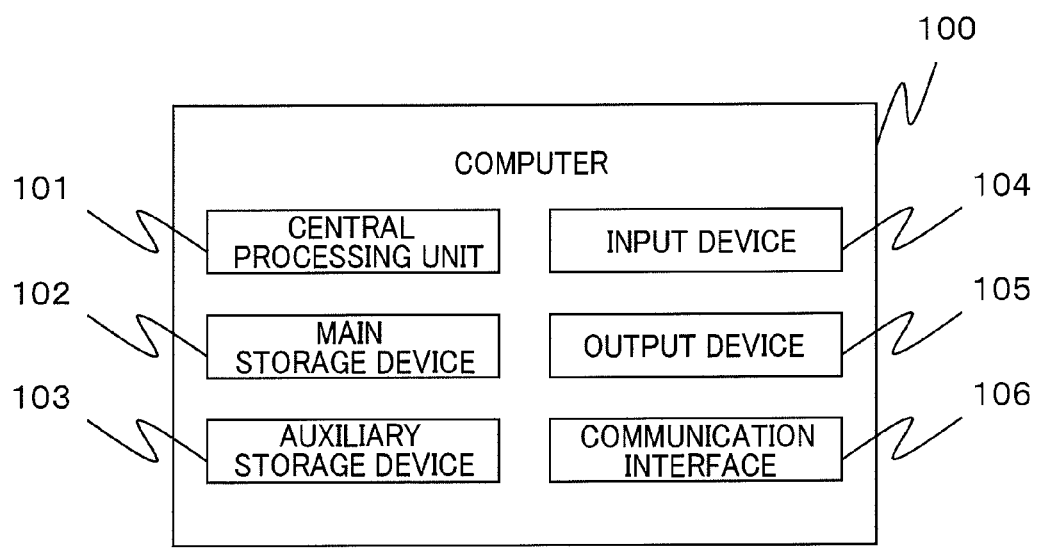
FIG. 1B is a diagram showing an example of a hardware configuration of a computer capable of being used as a server apparatus 10 and a host/client apparatus 30.

FIG. 1B is a diagram showing an example of a computer capable of being used as the server apparatus 10 or the host/client apparatus 30. This computer 100 includes a central processing unit 101 (e.g., a central processing unit (CPU) or a micro processing unit (MPU)), a main storage device 102 (e.g., a random access memory (RAM) or a read only memory (ROM)), an auxiliary storage device 103 (e.g., a hard disk), an input device 104 (e.g., a keyboard or a mouse) which receives an input operation by an user, an output device 105 (e.g., a liquid crystal monitor), and a communication interface 106 (e.g., a network interface card (NIC) or a host bus adapter (HBA)) which achieves communication with other devices.

The storage apparatus 20 provides the above storage area used by the host/client apparatus 30. The storage apparatus 20 includes a cache memory 21, a channel adapter 22 which performs communication with the server apparatus 10 and which writes and reads data to and from the cache memory 21, and a disk controller 23 which writes and reads data to and from the cache memory 21 and which writes and reads data to and from the hard disk 24. The storage apparatus 20 manages the hard disk 24 by a Redundant Array of Inexpensive Disk (RAID) method.

Figure 2:
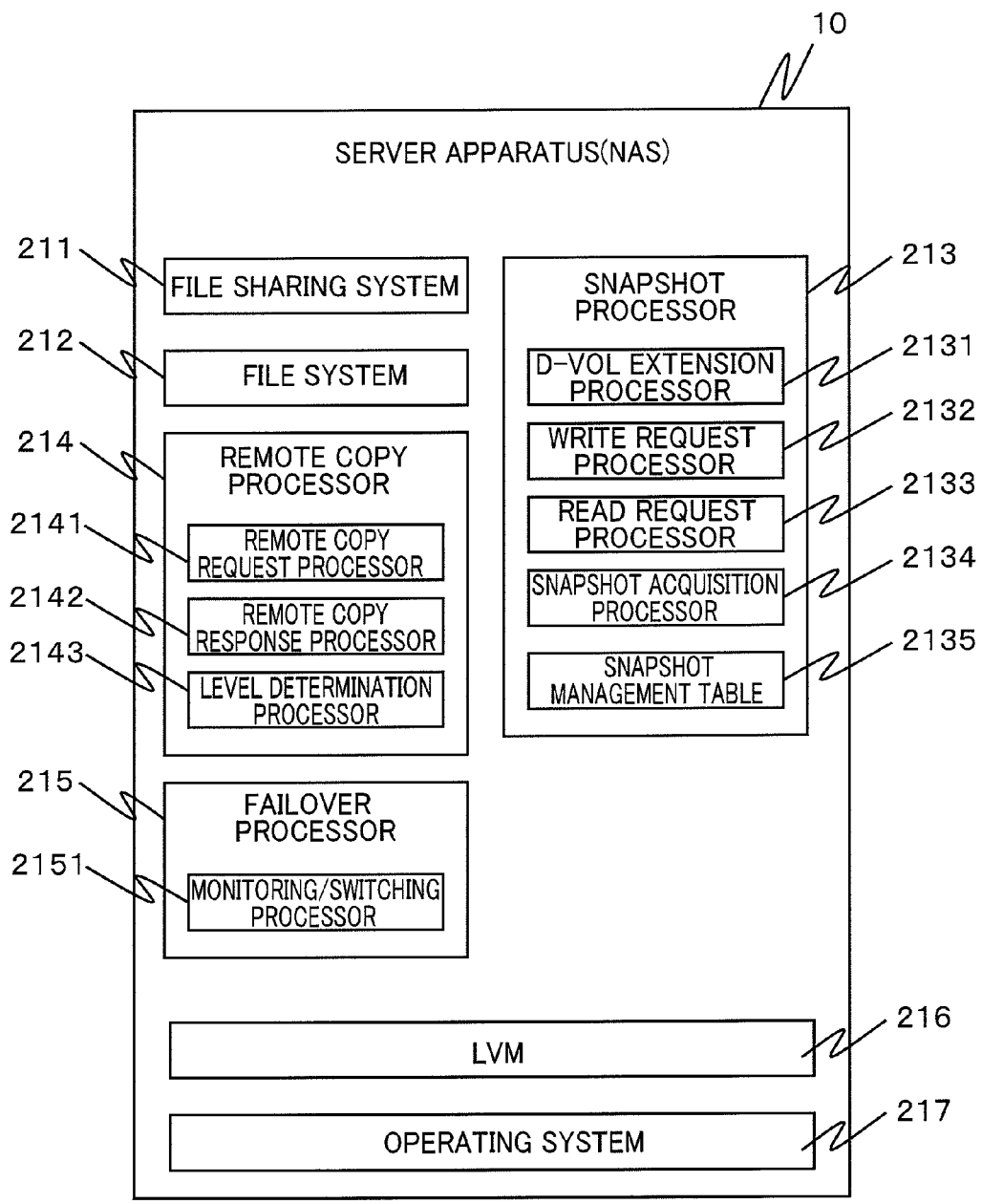
FIG. 2 is a diagram showing main functions of the server apparatus 10.

In FIG. 2, functions of the server apparatus 10 are shown. Functions shown in FIG. 2 are achieved by a CPU 11 of the server apparatus 10 executing a program stored in a memory 12 or a hard disk 13, or by functions originally provided to the hardware of the server apparatus 10. Of the functions shown in FIG. 2, to a device coupled to the communication network 50, a file sharing system 211 achieves a mechanism in which data stored in a storage area provided by the storage apparatus 20 are shared in unit of file or in unit of directory (unit of folder). For specific examples of the file sharing system 211, there are a Network File System (NFS) and a Common Internet File System (CIFS).

A file system 212 achieves a function for causing the device coupled to the communication network 50 to access data stored in the storage area provided by the storage apparatus 20, in unit of file or in unit of directory (unit of folder). For specific examples of the file system 212, there are file systems of UNIX® and of Windows®. Incidentally, in this embodiment, it is assumed that one or more file systems 212 which function independently in the server apparatus 10 are achieved.

The file system 212 manages information (hereinafter, referred to as file management information 310) for achieving the above mechanism. For example, as shown in FIG. 3A, a file system of UNIX system manages, as the file management information 310, a super block 3101, a directory entry 3102, an i node table 3103, and a data block 3104. Of those, in the super block 311, a size of a storage area, size of the empty region and the like which are management targets of the file system 212 are managed. As shown in FIG. 3B, in the directory entry 312, a correspondence relationship between a file name (a directory path name 3121) and an i node number 3122 is managed. As shown in FIG. 3C, in the i node table 313, information (owner 3132) identifying an owner of a file, an access right 3133, a file size 3134, and a storage position (an address of the data block 314 in which data of a corresponding file are stored) of a file are managed so that each of these corresponds to an i node number 3131.

Based on a logical device (logical unit or LU) being a unit of a logical storage device provided by the storage apparatus 20, an LVM 216 (LVM stands for Logical Volume Manager) shown in FIG. 2 provides an upper layer of the file system 212 and the like with a logical volume (hereinafter, referred to as LV) being a logical storage area. That is, the LVM 216 includes a function which enables an LU to be used as an LV and a function as a device driver which performs writing and reading of data, in unit of block, to and from the LV. An LU is a unit of storage area which is capable of being designated as a target by an initiator, for example, in Small Computer System Interface (SCSI) or an Attachment Packet Interface (ATAPI). Data block addresses 3135, 3136, and 3137 of the foregoing i node table 313 are block addresses of an LV. An operating system 217 controls data input/output of the server apparatus 10.

As described later, a primary volume (hereinafter, referred to as P-VOL 71 (P-VOL stands for Primary Volume.)) in a snapshot function and a difference volume (hereinafter, referred to as D-VOL 72 (D-VOL stands for Difference Volume.)) are each achieved with LV as a unit. FIG. 3D shows an arranged form of the above-described contents, and explains a state in which a storage area is provided to host/client apparatus 30, not shown, from the storage apparatus 20.

As shown in the drawing, together with P-VOL 71 and D-VOL 72, an auxiliary volume 74 which is added when a capacity of D-VOL 72 becomes insufficient is provided in advance by the LVM 216. Further, V-VOL 73 is a snapshot which is obtained by synthesizing P-VOL 71 and D-VOL 72 and which is capable of only reading.

The server apparatus 10 provides the host/client apparatus 30 with accessing to a storage area in unit of file via an IP address 217 allocated in advance. A resource group grouped in unit of such IP address is hereinafter referred to as a resource group RG. To each resource group RG, a plurality of LAN ports 218 are allocated depending on an input/output load of data or the like on the IP address 217 of the resource group RG. For resources necessary for providing the host/client apparatus 30 with a file sharing function, there are IP addresses 217 and the file system 212. A failover process between the server apparatuses 10 of local and remote sites is performed in unit of such resource group.

A snapshot processor 213 shown in FIG. 2 performs various processes on a snapshot function. Here, the snapshot function is one which, in response to a request from a user or the like, provides a state (referred to as a snapshot), at a certain time, of a logical volume (P-VOL 71) in operation. The snapshot function is capable of managing snapshots of plural generations (states of P-VOL 71 at plural points of time).

The snapshot processor 213 receives a snapshot acquisition request transmitted from the client apparatus 30, acquires a snapshot of a certain time, receives a reference request for a snapshot, provides the client apparatus 30 with a snapshot, deletes a snapshot, or performs other processes similar thereto. Here, the acquisition of a snapshot means to save, in D-VOL 72, data (hereinafter, referred to as difference data) of a block updated in P-VOL 71. Further, the provision of a snapshot means to reproduce a state of P-VOL 71 at a certain time in the past, based on present data of P-VOL 71 and on the difference data saved in D-VOL 72. Further, the deletion of a snapshot means to delete, from the D-VOL 72, the difference data being a deletion target.

As shown in FIG. 2, in addition to the above function, the snapshot processor 213 includes function of a D-VOL extension processor 2131, a writing request processor 2132, a reading request processor 2133, and a snapshot acquisition processor 2134.

According to a request received from a remote copy processor 214 (data copy processing part) to be described later, the D-VOL extension processor 2131 adds an auxiliary volume selected in a predetermined procedure as a D-VOL, and performs a process for extending capacity of the D-VOL.

The writing request processor 2132 performs a process in accordance with the above-described level, when writing is performed on P-VOL 71 by the client apparatus 30.

The reading request processor 2133 performs a process for providing the client apparatus 30 with a snapshot in accordance with the above-described level, when a reference request for a snapshot is made by the client apparatus 30.

The snapshot acquisition processor 2134 performs a process on an acquisition of a snapshot in accordance with the above-described level, when an acquisition request (a request on the starting of an acquisition of a snapshot on a specific P-VOL 71) of a snapshot is made by the client apparatus 30.

As shown in FIG. 2, the snapshot processor 213 manages a snapshot management table 2135 being a table on which information on a snapshot is managed. On the snapshot management table 2135, a Copy on Write (CoW) is managed which is made by writing a snapshot of each generation, by copying, onto a data block of P-VOL 71.

Figure 4A:
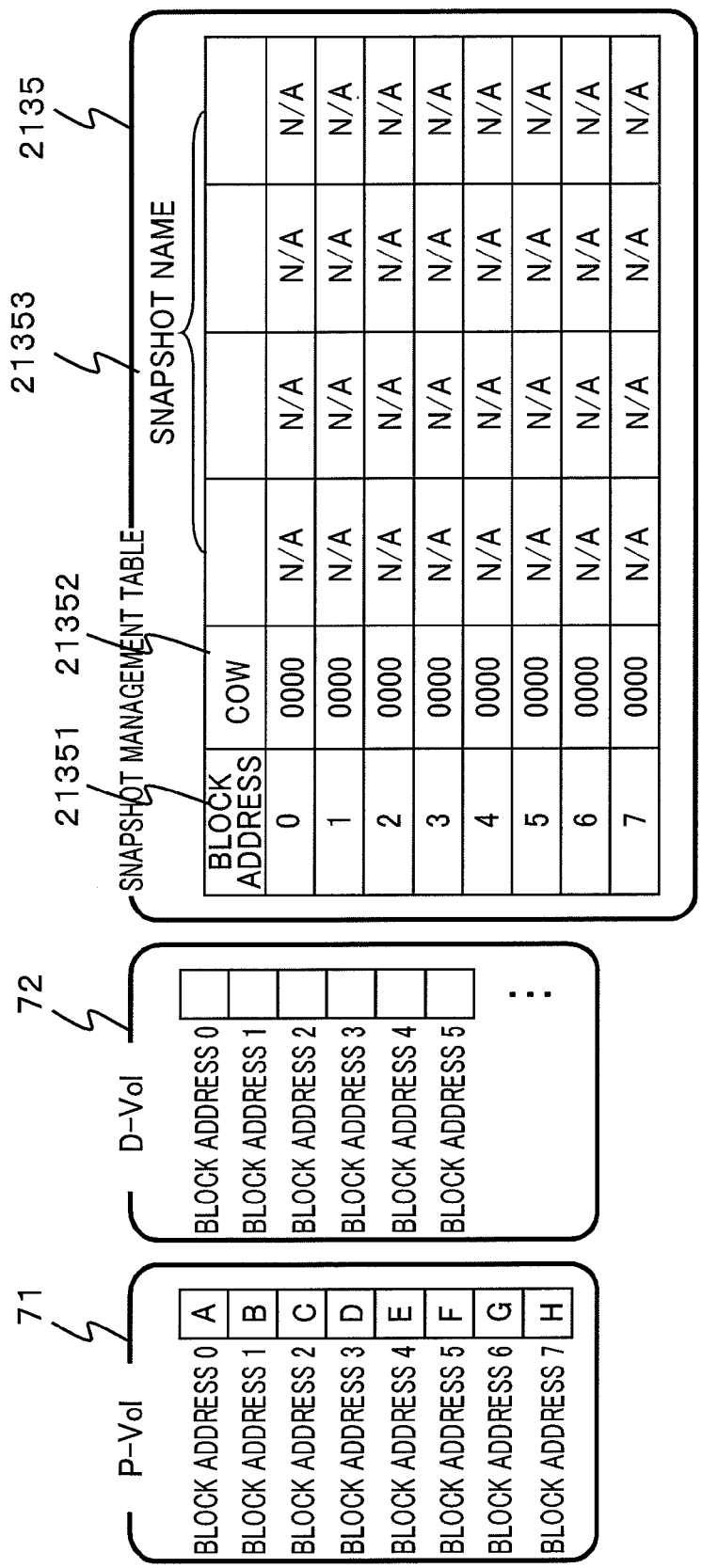
FIG. 4A is a first diagram for explaining a process performed at the time of an acquisition of a snapshot.

A snapshot corresponding to each generation is managed by data stored in P-VOL 71, data stored in D-VOL 72, and information managed by the snapshot management table 2135. As shown in FIG. 4A and the like, on the snapshot management table 2135, a CoW bitmap 21352 and information (here, a snapshot name 21353) identifying each snapshot are managed so that these items 21352 and 21353 each correspond to a block address 21351 of each data block. Incidentally, the CoW bitmap 21352 is constituted of bit columns, the number of the bit columns corresponding to each generation of a snapshot capable of being acquired. Further, in the following description, it is assumed that respective bits correspond to a first generation and a second generation in sequence from most significant bits (leftmost bits).

A remote copy processor 214 regularly copies data, in unit of RG, between the server apparatuses 10 to perform a duplication process of the data, the data being stored in the storage apparatuses 20 respectively coupled to the server apparatuses 10 of the local and remote sites. The remote copy processor 214 includes a remote copy request processor 2141, a remote copy response processor 2142, and a level determination processor 2143.

The remote copy request processor 2141 receives a remote copy request from the server apparatus 10 of the local site, and performs a process for updating data stored in P-VOL 71 and D-VOL 72 on the remote side based on information on difference data of a snapshot notified from the local site.

For each RG, in accordance with a determination result by the level determination processor 2143 to be described later, the remote copy response processor 2142 performs a remote copy process, corresponding with the determined level, on the RG. Further, in some cases, a remote copy process is not performed depending on the level determination result of the RG.

The level determination processor 2143 sets a level being information for determining the contents of a remote copy process to be performed for each resource group RG of the server apparatus 10.

A failover processor 215 (failover processing part) includes a monitoring/switching processor 2151. The monitoring/switching processor 2151 performs a process of monitoring the number of auxiliary volumes between the server apparatuses 10 of the local and remote sites. Further, in response to a request from the remote copy response processor 2142, a failover process is performed in unit of RG between the server apparatuses 10.

Next, a management method of a snapshot performed by the snapshot processor 213 will be explained by taking a case where writing of data onto P-VOL 71 occurs as an example, by accompanying FIGS. 4A to 4D. Further, in the following description, it is assumed that P-VOL 71 and D-VOL 72 each include eight data blocks, the number of generations of manageable snapshots is four, and the CoW bitmap 21352 is constituted of 4 bits.

FIG. 4A shows states (hereinafter, referred to as initial states) of P-VOL 71, D-VOL 72, and the snapshot management table 2135 before the writing of data onto P-VOL 71. In the initial states, as shown in FIG. 4A, data of "A," "B," "C," "D," "E," "F," "G" and "H" are stored in data blocks 21352 which correspond to block addresses 0 to 7 (block addresses 21351) of P-VOL 71, respectively. In the initial states, not even one snapshot is acquired, so that no data are stored in respective data blocks of D-VOL 72 (e.g., spaces or NULLs are stored). Each of the bits of CoW bitmaps 21352 of the snapshot management table 2135 are each equal to 0, and no data are stored in the snapshot name 21353 (e.g., spaces or NULLs are stored).

Figure 4B:
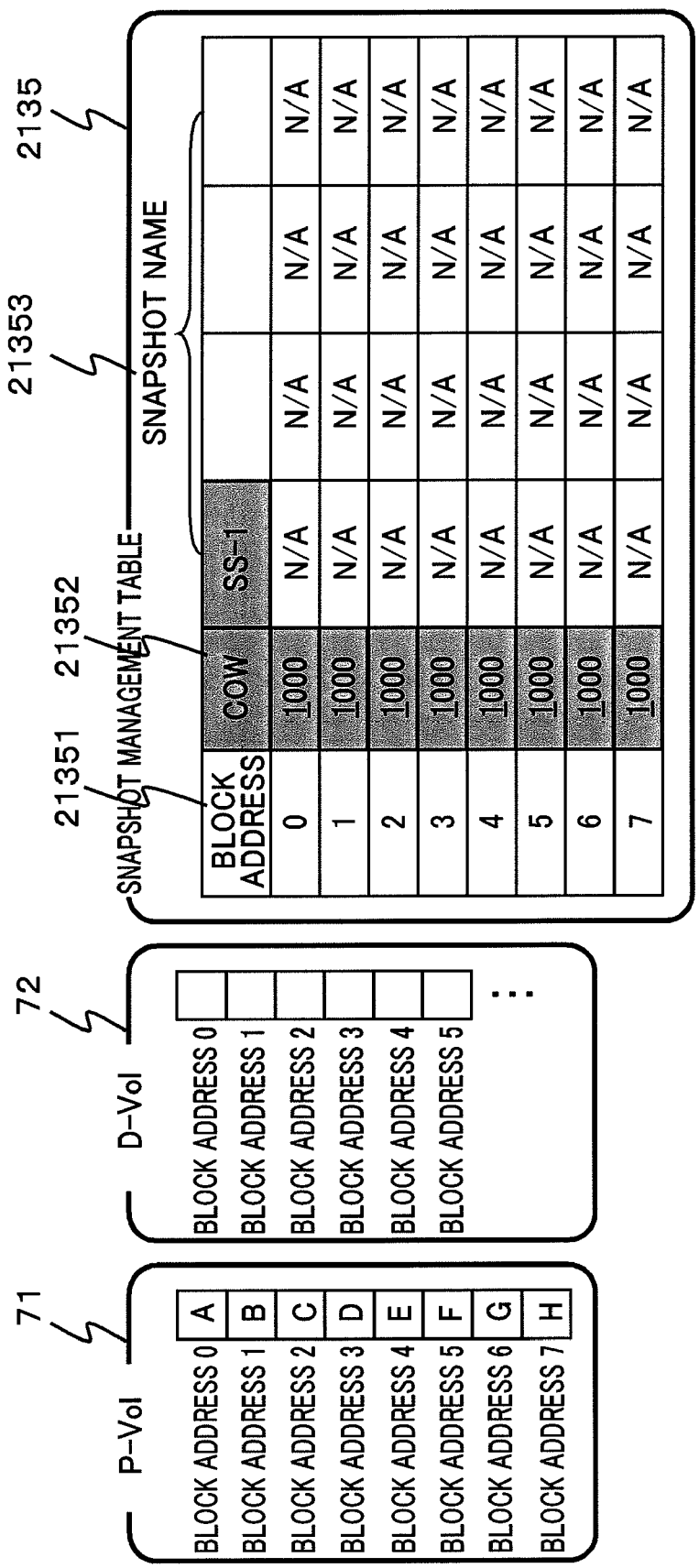
FIG. 4B is a second diagram for explaining the process performed at the time of the acquisition of the snapshot.

FIG. 4B shows a state after the receiving of an acquisition request for a first snapshot (snapshot name 21353="SS-1") from the client apparatus 30, in the initial state of FIG. 4A. As shown in FIG. 4B, most significant bits (leftmost bits) of the CoW bitmaps 21352 corresponding to the respective block addresses 0 to 7 are each set to 1. In the snapshot name 21353, no data are stored since a snapshot is not actuary acquired.

Figure 4C:
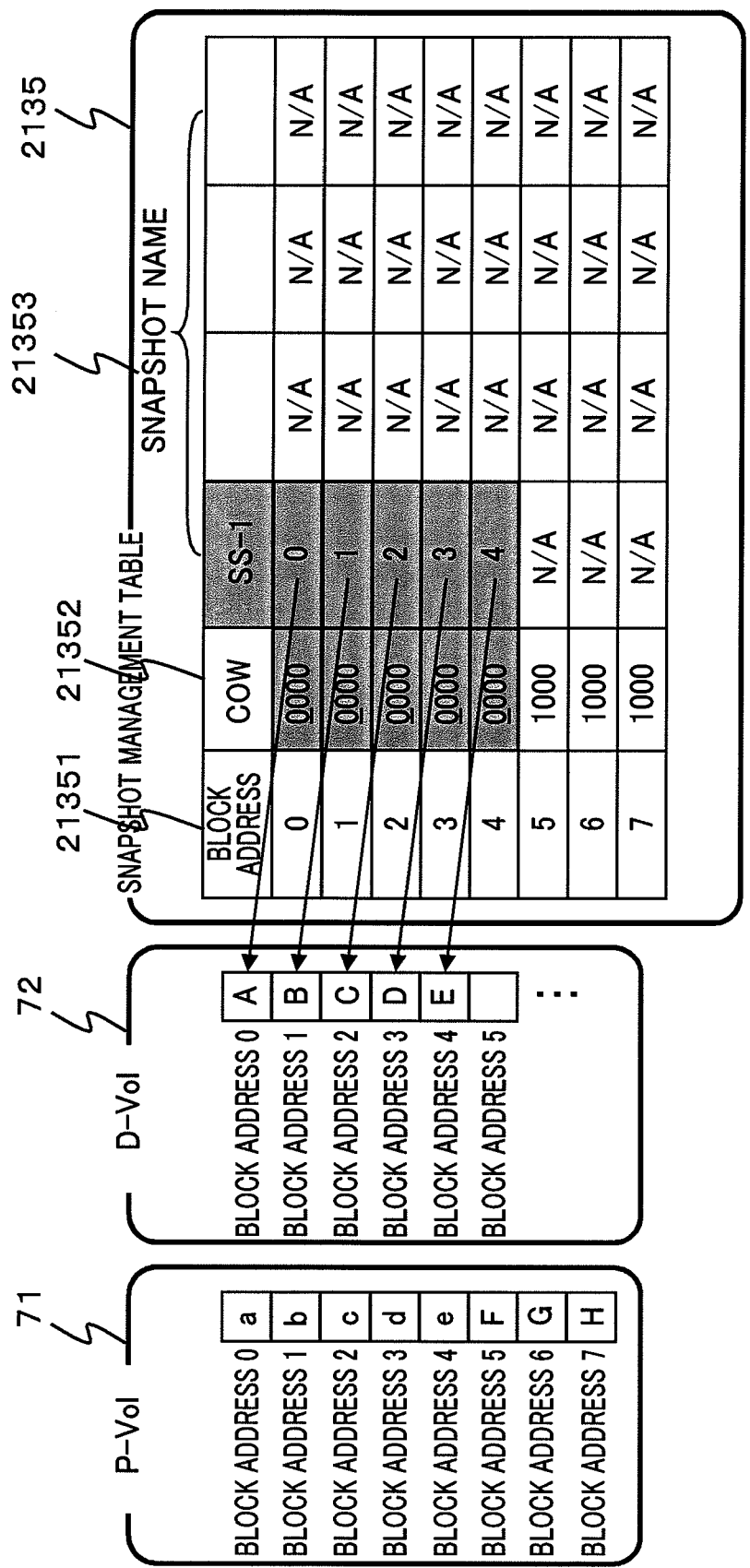
FIG. 4C is a third diagram for explaining the process performed at the time of the acquisition of the snapshot.

FIG. 4C shows a state after data blocks at the block addresses 0 to 4 of P-VOL 71 are updated respectively with "a," "b," "c," "d" and "e," in the state of FIG. 4B. As shown in FIG. 4C, the previous data "A," "B," "C," "D" and "E" stored at the block addresses 0 to 4 are stored (saved) in the data blocks at the block addresses 0 to 4 of D-VOL 72. Further, since the first generation snapshots are acquired (necessary data are saved to D-VOL 72), most significant bits (leftmost bits) of the CoW bitmap 21352 are each set (reset) to 0. Further, since all the bits of the CoW bitmap 21352 are 0s, a snapshot is not acquired even when the data of P-VOL 71 are updated in this state. In the fields of "SS-1" of the snapshot name 21353, the block addresses "0," "1," "2," "3" and "4" of D-VOL 72 which are the saving destination of the previous data "A," "B," "C," "D" and "E" are set so as to correspond to the respective block addresses 21351.

Figure 4D:
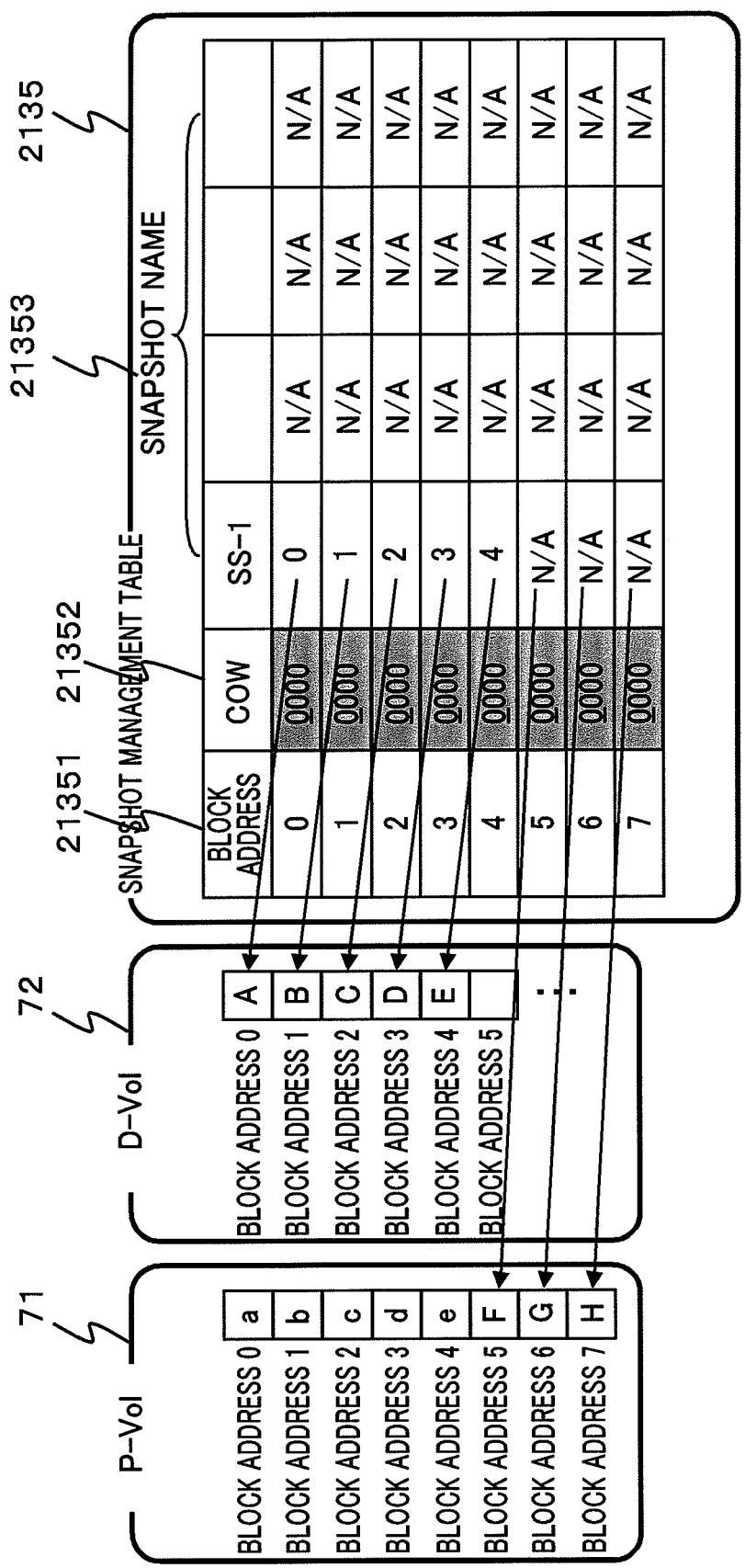
FIG. 4D is a fourth diagram for explaining the process performed at the time of the acquisition of the snapshot.

FIG. 4D shows a process of the snapshot processor 213 in the case where a reference request for the first generation snapshot is made from the client apparatus 30, in the state of FIG. 4C.

In order to generate snapshots of data blocks at the block addresses 0 to 4, the snapshot processor 213 acquires data stored in the data blocks at the block addresses 0 to 4 of D-VOL 72. Incidentally, the snapshot processor 213 recognizes that the first generation snapshots of the data blocks at the block addresses 0 to 4 are present in D-VOL 72, by referring to the contents of "SS-1" of the snapshot name 21353 of the snapshot management table 2135. Next, for the data blocks at the block addresses 5 to 7, the snapshot processor 213 acquires data from data blocks of P-VOL 71. Thereafter, the snapshot processor 213 generates a whole snapshot of P-VOL 71 by combining the data at the block addresses 0 to 4 acquired from D-VOL 72 and the data at the block addresses 5 to 7 acquired from P-VOL 71, and thereafter transmits the snapshot thus generated to a request source (client apparatus 30).

By referring to FIGS. 4A to 4D, a description has been made above on the case where a snapshot acquisition request for first generation is made, and when snapshot acquisition requests of second to fourth generation are made, the same processes are performed.

Subsequently, a remote copy process of a snapshot is described with reference mainly to FIGS. 5A to 5C. As described above, in the server apparatus 10 of the local site, snapshots are regularly generated in accordance with a time interval set by a user. In a remote copy process of these snapshots, differences between the snapshots are extracted and copied onto the server apparatus 10 of the remote site. The size of difference data between each of the snapshots depends on the size of a file update performed by a user within a snapshot acquisition time interval. Accordingly, an amount of transfer data in the remote copy process and time required for the remote copy process change.

First, between the server apparatuses 10 of the local and remote sites, both snapshots are synchronized by an initial copy. Here, both snapshots are assumed to be synchronized in a state in which first generation snapshots "SS-1" are acquired (the state shown in FIG. 4B).

Figure 5A:
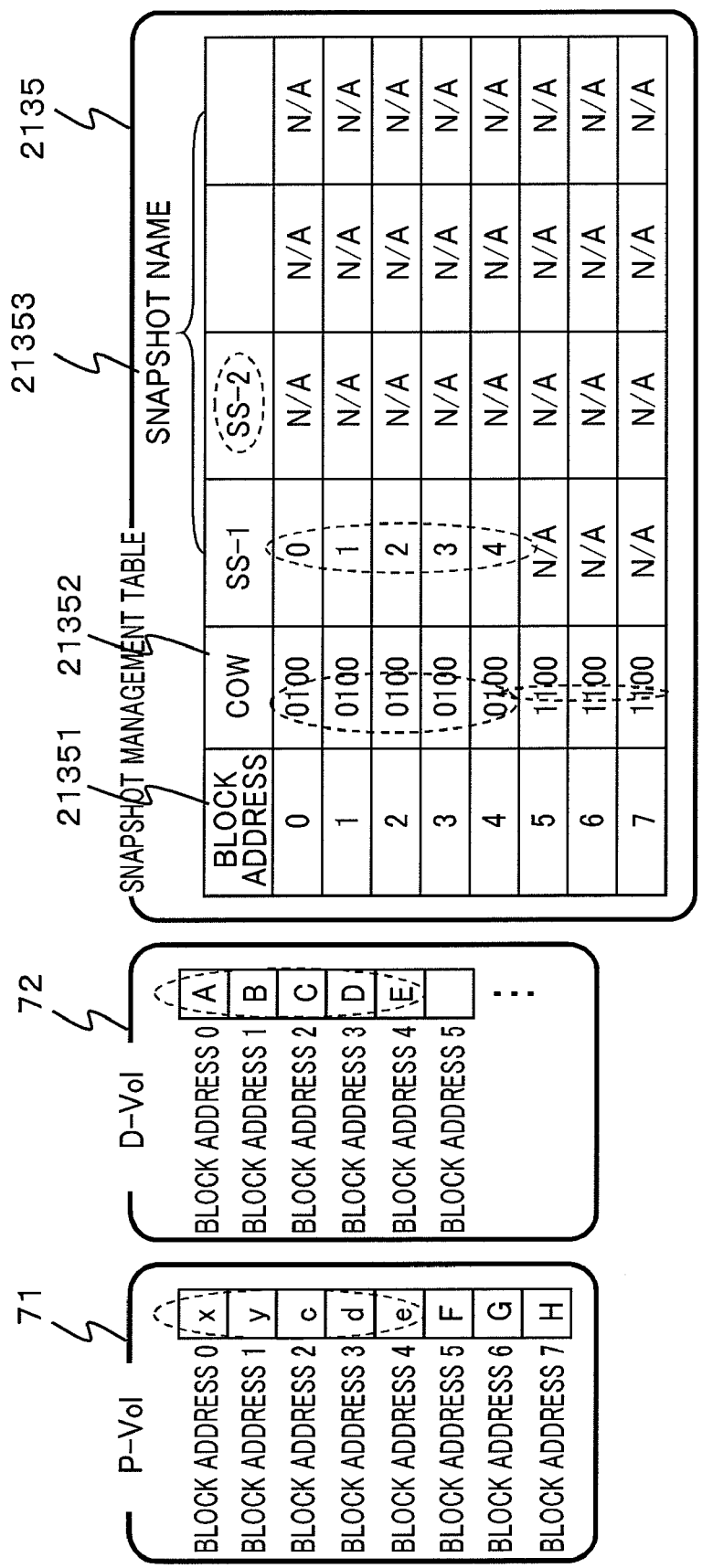
FIG. 5A is a first diagram for explaining a remote copy process of the snapshot.
Figure 5B:
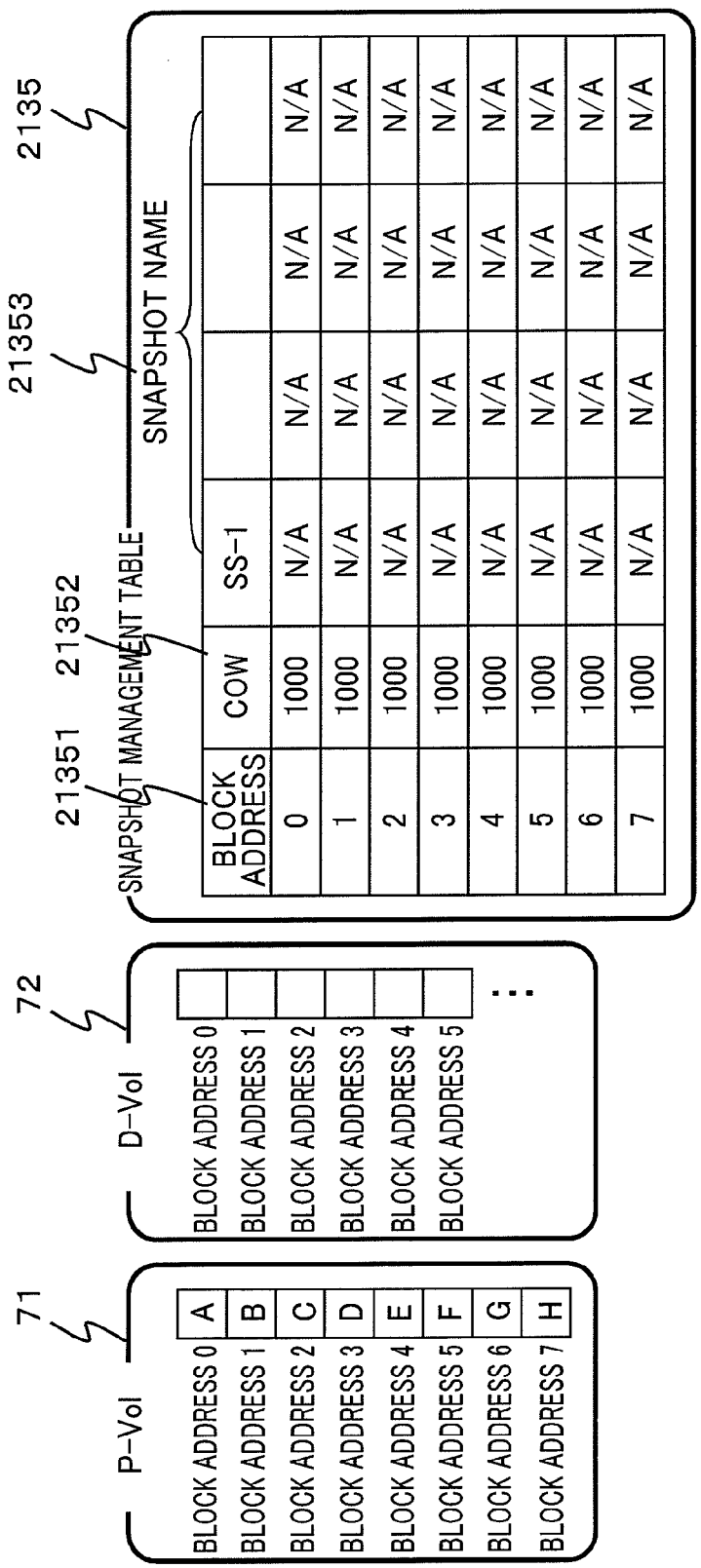
FIG. 5B is a second diagram for explaining the remote copy process of the snapshot.
Figure 5C:
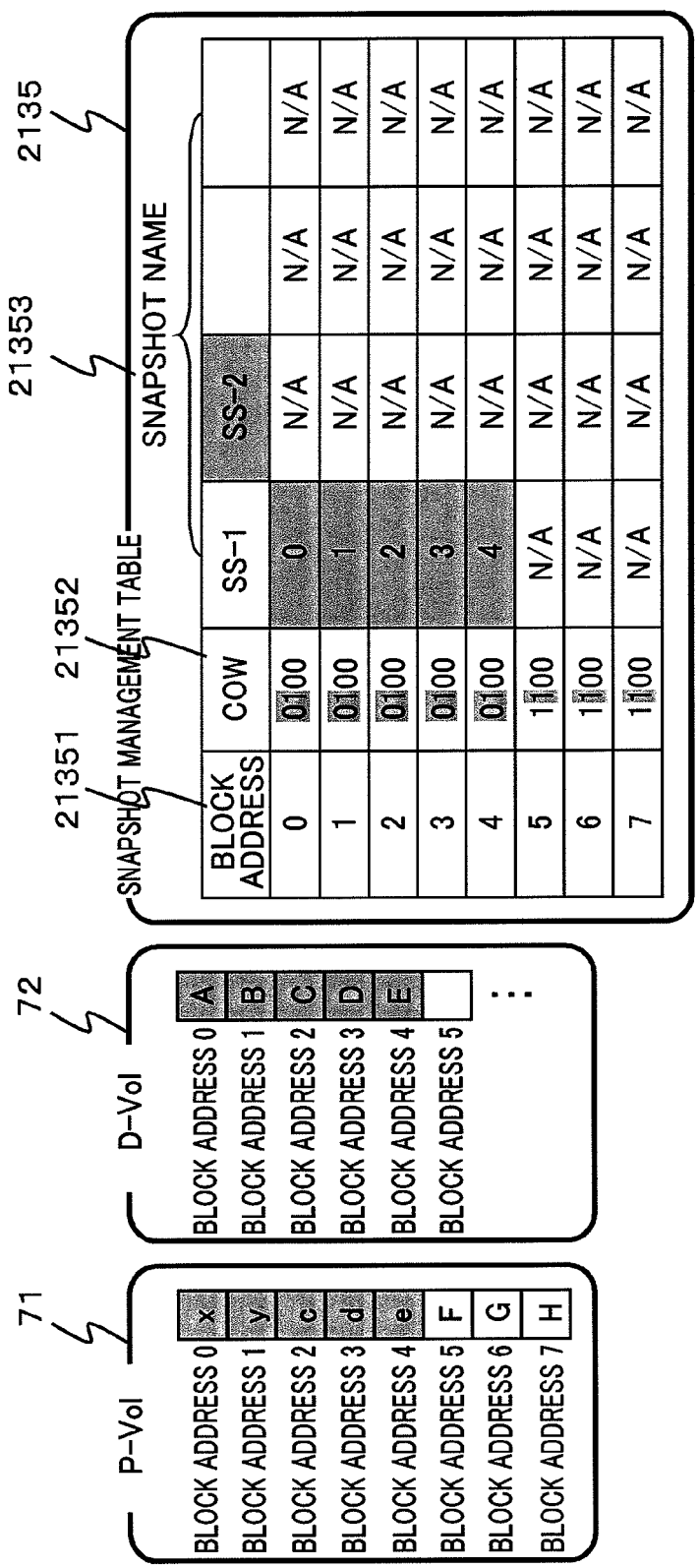
FIG. 5C is a third diagram for explaining the remote copy process of the snapshot.

In FIG. 5A, a state is shown in which an update occurs in the server apparatus 10 of the local site, and second generation snapshot "SS-2" is generated. FIG. 5A shows the state after the data blocks at the block addresses 0 to 4 of P-VOL 71 are respectively updated with "x," "y," "c," "d" and "e," in the state of FIG. 4B. As shown in FIG. 5A, the previous data "A," "B," "C," "D" and "E" stored at the block addresses 0 to 4 are stored (saved) in the data blocks at the block addresses 0 to 4 of D-VOL 72. Further, since the second generation snapshot is acquired, most significant bits (leftmost bits) corresponding to the block addresses 0 to 4 of the CoW bitmap 21352 are each set (reset) to 0. Further, since no difference occurs (there is no update), second bits (second bits from left) of the CoW bitmap 21352 are all set to 1. In the fields of "SS-2" of the snapshot name 21353, the block addresses "0," "1," "2," "3" and "4" of D-VOL 72 which is the saving destination of the previous data "A," "B," "C," "D" and "E" are set so as to correspond to the respective block addresses 21351. At this time, since an update is not reflected on the snapshots of the remote site, the state remains unchanged from FIG. 4B, as shown in FIG. 5B.

Next, when a first remote copy process is performed after an update is made on the local site, the remote copy processor 214 of the server apparatus 10 of the local site requests the remote copy processor 214 of the server apparatus 10 of the remote site to transmit the snapshot management table 2135, and acquires the snapshot management table 2135. The remote copy processor 214 of the local site compares the acquired snapshot management table 2135 of the remote site with that of the local site. In examples of FIGS. 5A and 5B, when the most significant bits of the CoW bitmap 21352 are compared in order of block addresses for the first generation snapshot "SS-1," discrepancy occurs in the block addresses 0 to 4, so that it can be seen that there has been a data update. Difference data are "x," "y," "c," "d" and "e" stored at the block addresses 0 to 4 of D-VOL 72. Subsequently, when second bits (second bits from left) of the CoW bitmap 21352 are checked in order of addresses, a CoW has not occurred along with the data update, so that it can be seen that only the second generation snapshot "SS-2" is acquired, but difference data have not occurred. Difference data extracted at the server apparatus 10 of the local site are notified to the server apparatus 10 of the remote site.

In the server apparatus 10 of the remote site, based on the notified difference data, the remote copy processor 214 updates the block addresses 0 to 4 of P-VOL 71 are updated with "x," "y," "c," "d" and "e," sets the most significant bits of the CoW bitmap 21352 to 0, and acquires the second generation snapshot "SS-2". Since there is no data update on this "SS-2," the second bits of the CoW bitmap 21352 are set to 1 (FIG. 5C).

Described next is a definition of a level of an RG being a determination criterion for changing the contents of the remote copy process to be applied to each RG. The level of an RG is defined to determine the level of importance of data input/output performed on each RG. The importance of each RG is objectively determined in accordance with this level definition. According to this determination, it is determined in what type of mode a remote copy process is performed on each RG, e.g., on an RG the importance of which is considered to be high, selected is a mode in which a remote copy process is securely performed, or on an RG the importance of which is considered to be not so high, a mode may be selected in which a remote copy process is not performed.

In this embodiment, the following three items are adopted as the determination criterion for determining the level of each RG.

(1) Band of an IP Address Allocated to Each RG

A band allocated to an IP address 218 of each RG is acquired by checking the number of LAN ports 219. The higher the number of LAN ports 219, the wider the allocated band; it is presumed that the scale of use of an RG is large and the importance thereof is high.

(2) Number of File Systems in an RG

The number of file systems set in each RG is acquired; it is presumed that the larger the number of file systems, the larger the scale of file sharing and the higher the importance of an RG is.

(3) Number of Users

The number of users of each RG is acquired; it is presumed that the larger the number of users, the larger the scale of file sharing and higher the importance of an RG.

In this embodiment, in accordance with the above three items, the level of each RG is defined in three stages as follows.

Level 1: 0<Number of LAN Ports$\leqq$2 and 0<Number of File Systems$\leqq$5 and 0<Number of Users$\leqq$10
Level 2: 2<Number of LAN Ports$\leqq$5 and 5<Number of File Systems$\leqq$20 and 10<Number of Users$\leqq$50
Level 3: 5<Number of LAN Ports$\leqq$10 and 20<Number of File Systems$\leqq$30 and 50<Number of Users$\leqq$200.

Incidentally, the items of the RG level determination criterion, and the level definition are not limited to the above examples on the items and ranges, but other suitable criterion and ranges may be adopted. The level definitions are recorded, for example, on the remote copy processor 214 as a level definition file.

Tables referred in this embodiment are described below.

First, an RG management table 600 is described. An example of the RG management table 600 is shown in FIG. 6. This RG management table 600 is for managing states of each RG included in the server apparatus 10. The RG management table 600 records RG name 601, present level 602, application date and time of the present level 603, total time spent at each level 604, IP address allocated to each RG 605, and file system name included in each RG 606.

The RG name 601 represents a reference symbol given uniquely to each RG to identify RGs from each other. The present level 602 represents a latest level obtained by making a determination on an RG. As described later, the level of each RG is regularly determined by a level determination processor 2413 in the remote copy processor 214 of the server apparatus 10.

The application date and time of the present level 603 records points of time when a latest change on the level of RG is made. The total time spent at each level 604 records, for each level, the total time in which the level of RG is determined as one of levels 1 to 3, based on the date and time 603. The IP address allocated to each RG 605 is referred to by the level determination processor 2143 when acquiring the number of LAN ports included in the RG. The file system name included in each RG 606 records file system names held by respective RGs, and uses the records file system names as keys to recognize the volumes used by respective RGs.

Next, a file system management table 700 is described below. FIG. 7 shows an example of the file system management table 700. The file system management table 700 manages file systems included in the server apparatus 10 and volume used by each of the file systems so that the file systems and the volumes correspond to each other. On the file system management table 700, recorded are file system name 701, P-VOL name and assigned volume names 702, D-VOL name and assigned volume names 703, and D-VOL remaining capacity 704.

The file system names 701 each represents a reference symbol given uniquely to each file system in each server apparatus 10 to identify file systems from each other. The P-VOL name and assigned volume names 702 and the D-VOL name and assigned volume names 703 record P-VOL 71 and D-VOL 72 used by each file system, and also record identification symbols representing volumes to which P-VOL 71 and D-VOL 72 correspond. The D-VOL remaining capacity 704 records the remaining capacity of D-VOL 72 used by each file system in unit of MB.

Next, an auxiliary volume management table 800 is described. FIG. 8 shows an example of the auxiliary volume management table 800. The auxiliary volume management table 800 is for managing an auxiliary volume 74 capable being added to D-VOL 72 included in each server apparatus 10. The auxiliary volume management table 800 records a volume name 801, volume size 802, and an allocation state 803.

The volume name 801 represents an identification symbol given to each volume set in the storage apparatus 20 coupled to each server apparatus 10, and the volume size 802 represents the size of the each volume in unit of MB. The allocation state 803 is to indicate whether each volume has already been allocated to D-VOL 72. When a record of the allocation state 803 indicates "NOT DONE," it can be seen that the volume is an auxiliary volume 74.

Next, a remote copy setting management table 900 is described below. FIG. 9 shows an example of the remote copy setting management table 900. The remote copy setting management table 900 manages, for each RG, whether the server apparatus 10 on the local site or on the remote site is on the primary side or on the secondary side in a remote copy process. The remote copy setting management table 900 records an RG name 901, a primary side server name 902 and a secondary side server name 903 in the case where a remote copy process is performed on the RG. When a failover process is performed for each RG between the server apparatuses 10 of the local and remote sites, the primary side and the secondary side on an RG are interchanged, so that the remote copy setting management table 900 is updated by the failover processor 215.

Next, a process flow performed by a remote copy controller of the present invention is described with reference to the drawings.

==Level Determination Process==

Figure 10:
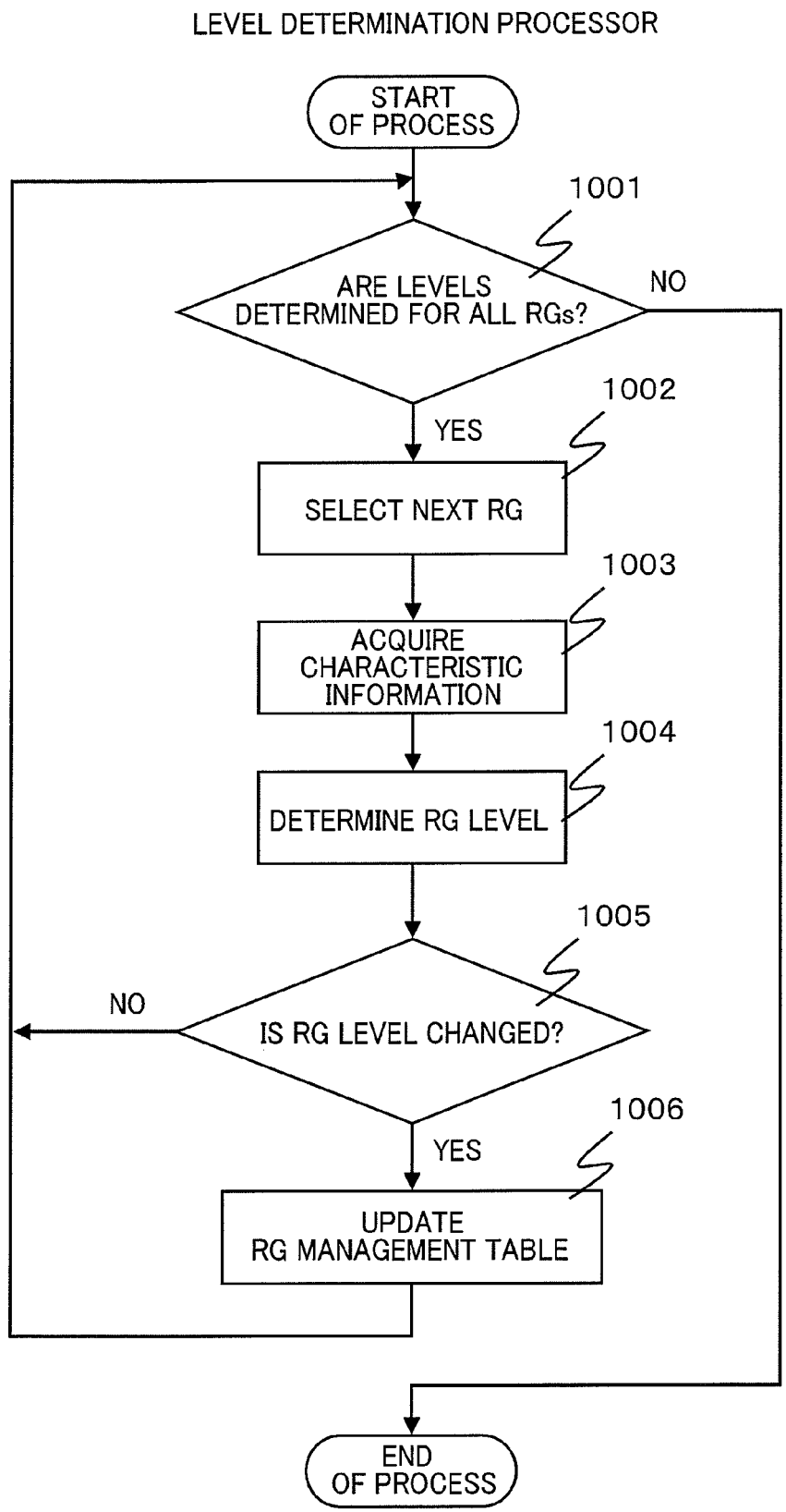
FIG. 10 is a flowchart for explaining a level determination process for RG.

FIG. 10 shows a flow of a level determination process on RG performed by the level determination processor 2143 in the remote copy processor 214 of the server apparatus 10. The level determination process is a process for regularly determining the level of each RG in the server apparatus 10 of the local site or the remote site, in order to perform a suitable remote copy process for each RG.

Once after starting the process, the level determination processor 2143 checks whether level determination on all RGs is complete, and terminates the process when it is complete (Yes in S1001). Incidentally, the letter "S" preceding each number stands for "Step."

When there is an RG the level of which is not determined (No in S1001), the next RG is selected (S1002), and characteristic information of the RG is acquired (S1003). In this embodiment, the level determination processor 2143 communicates with a suitable information gathering program (not shown) implemented in the server apparatus 10, and acquires the characteristic information (here, for example, the number of LAN ports, the number of file systems, and the number of users).

Next, the acquired characteristic information of the RG is referred to level definitions of the level definition file so as to determine the level of the RG (S1004). A level thus determined is compared with the present level 602 of the RG of the RG management table 600. When it is determined that there is a change on the level (Yes in S1005), the record of the RG management table 600 is updated (S1006). When it is determined that there is no change on the level (No in S1005), the process returns to the determination step S1001 which determines if there are some RGs left to be determined.

==Remote Copy Request Process==

Figure 11:
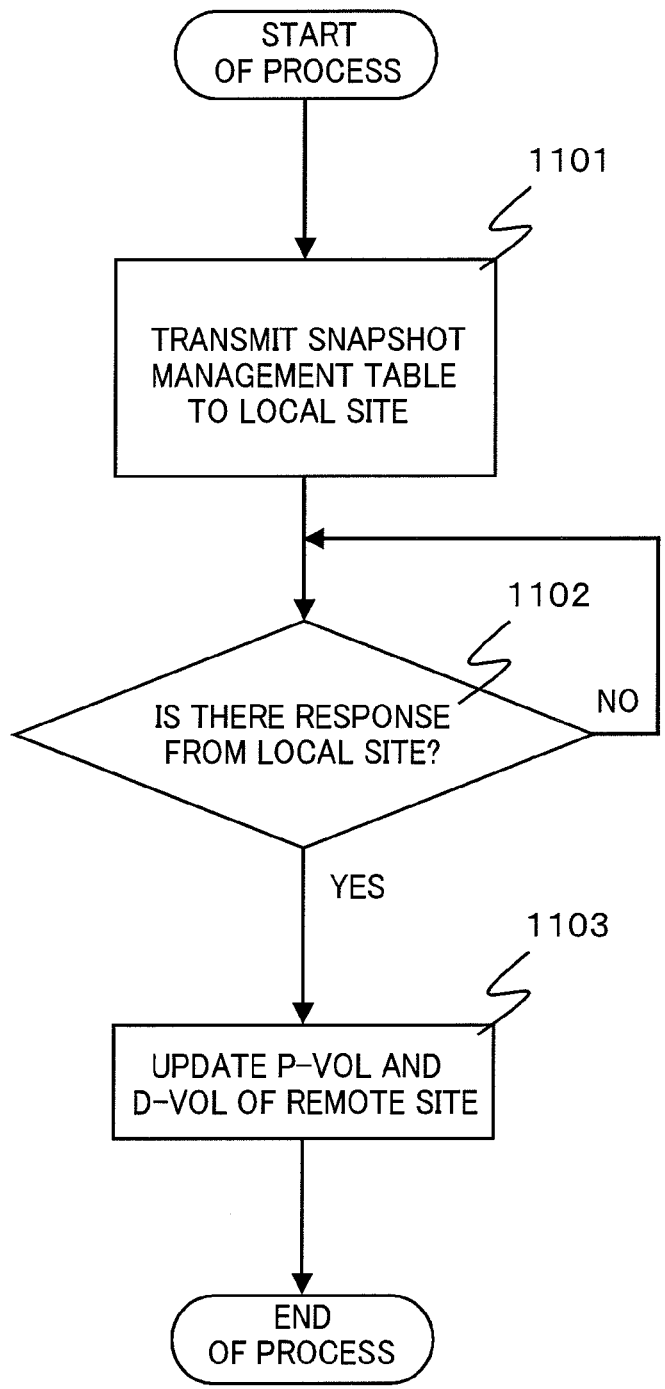
FIG. 11 is a flowchart for explaining a remote copy request process.

FIG. 11 shows a flow of a remote copy request process performed by the remote copy request processor 2141 in the remote copy processor 214 of the server apparatus 10. The remote copy request process is a process in which a remote copy process on each RG is requested at predetermined time intervals in accordance with an instruction from an upper OS or an application. In this embodiment, a configuration is made so that a start request is made from the server apparatus 10 of the remote site to the server apparatus 10 of the local site. However, a start may be made from the local site.

Once starting the process, the remote copy request processor 2141 of the server apparatus 10 of the remote site transmits the snapshot management table 2135 held by itself to the server apparatus 10 of the local site (S1101), and waits for a transmission of a result obtained from the process performed by the server apparatus 10 of the local site (S1102). After receiving the process result from the server apparatus 10 of the local site (Yes in S1102), the remote copy request processor 2141 updates data of P-VOL 71 and D-VOL 72 so that snapshots of the RG of the server apparatus 10 of the remote site are updated in accordance with the process result, then the process is terminated.

==Remote Copy Response Process==

Figure 12:
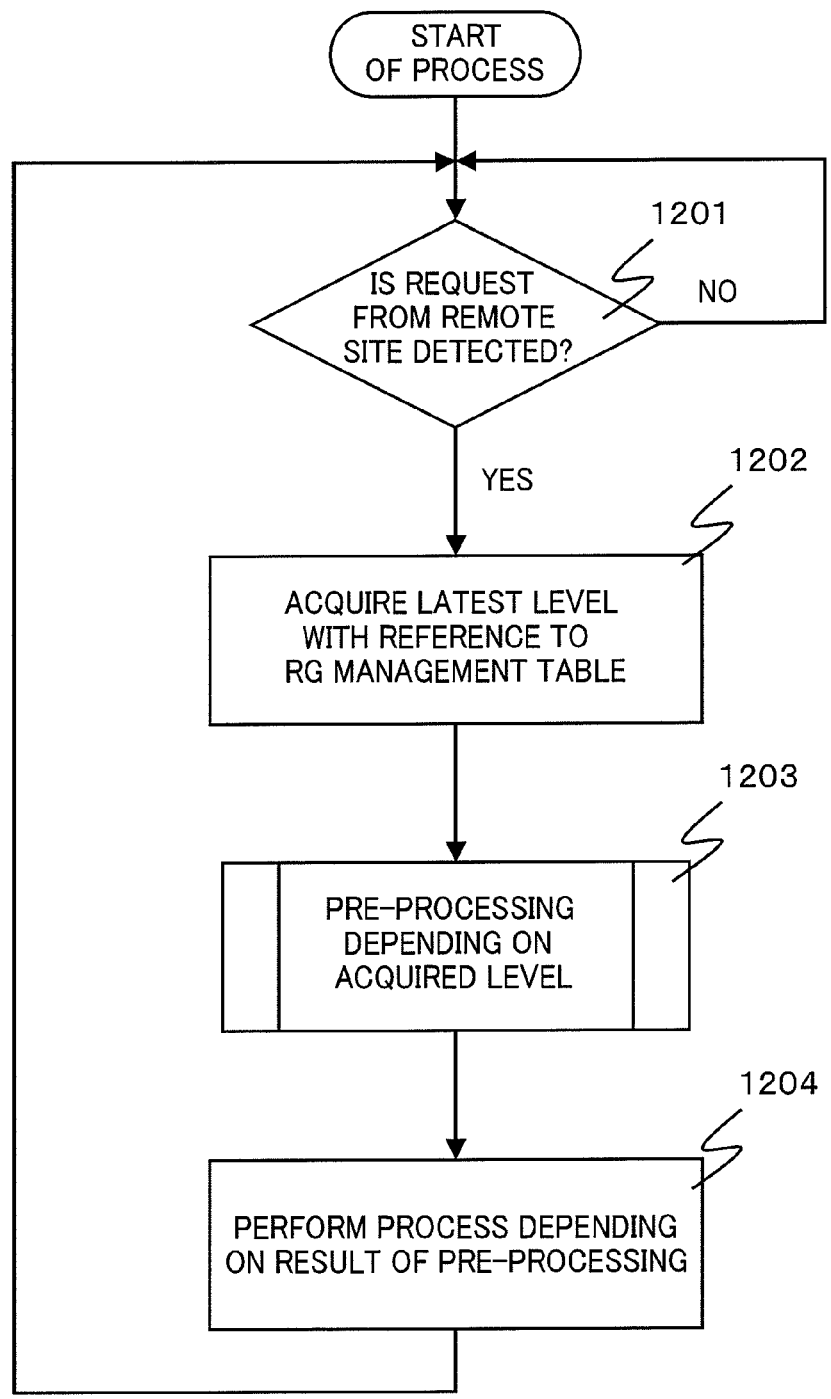
FIG. 12 is a flowchart for explaining a remote copy response process.

FIG. 12 shows a flow of a remote copy response process to be performed by the remote copy response processor 2142 in the remote copy processor 214 of the server apparatus 10. The remote copy response process is a process performed in the server apparatus 10 of the local site, which is triggered by, in the present embodiment, a process request acquisition from the remote copy request processor 2141 in the server apparatus 10 of the remote site, i.e., after receiving the snapshot management table 2135 on the remote side. Incidentally, as described above, the roles of local and remote sites may be configured to be interchanged.

After starting the process, the remote copy response processor 2142 waits for a receipt (a receipt of the snapshot management table 2135 on the remote side) of a process request from the server apparatus 10 of the remote site (S1201). After the receipt (Yes in S1201), the remote copy response processor 2142 refers to its own RG management table 600, and acquires the present level 602 on the RG recorded therein (S1202).

Next, the remote copy response processor 2142 performs pre-processing depending on the acquired level of the RG (S1203), and performs a process depending on a result of the pre-processing (S1204), then the processing flow is terminated. The contents of processing depending on these RG levels are described later.

==RG Level-Dependent Process==

Figure 13:
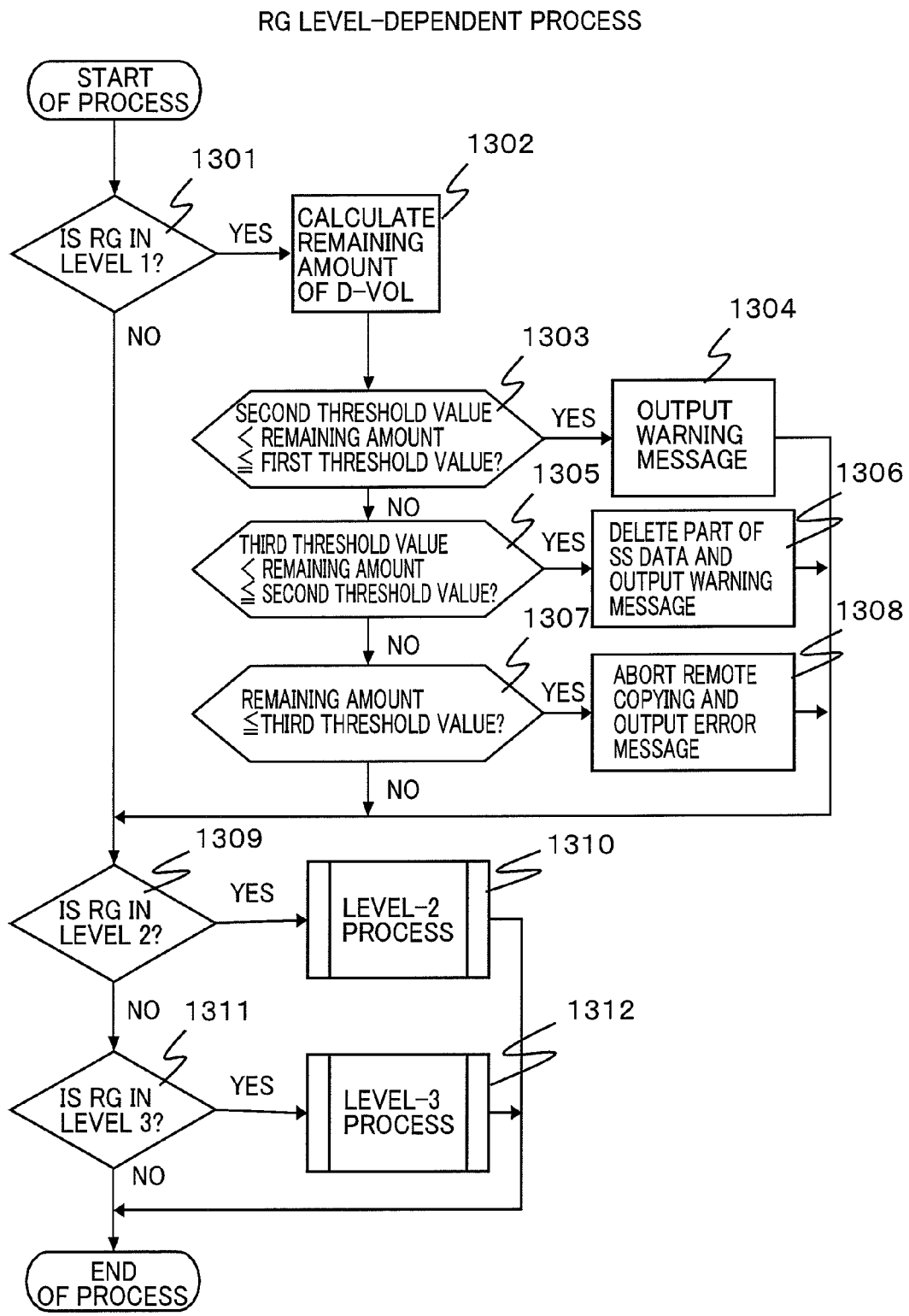
FIG. 13 is a flowchart for explaining a pre-process performed depending on a level of RG and a process corresponding to level 1.
Figure 14:
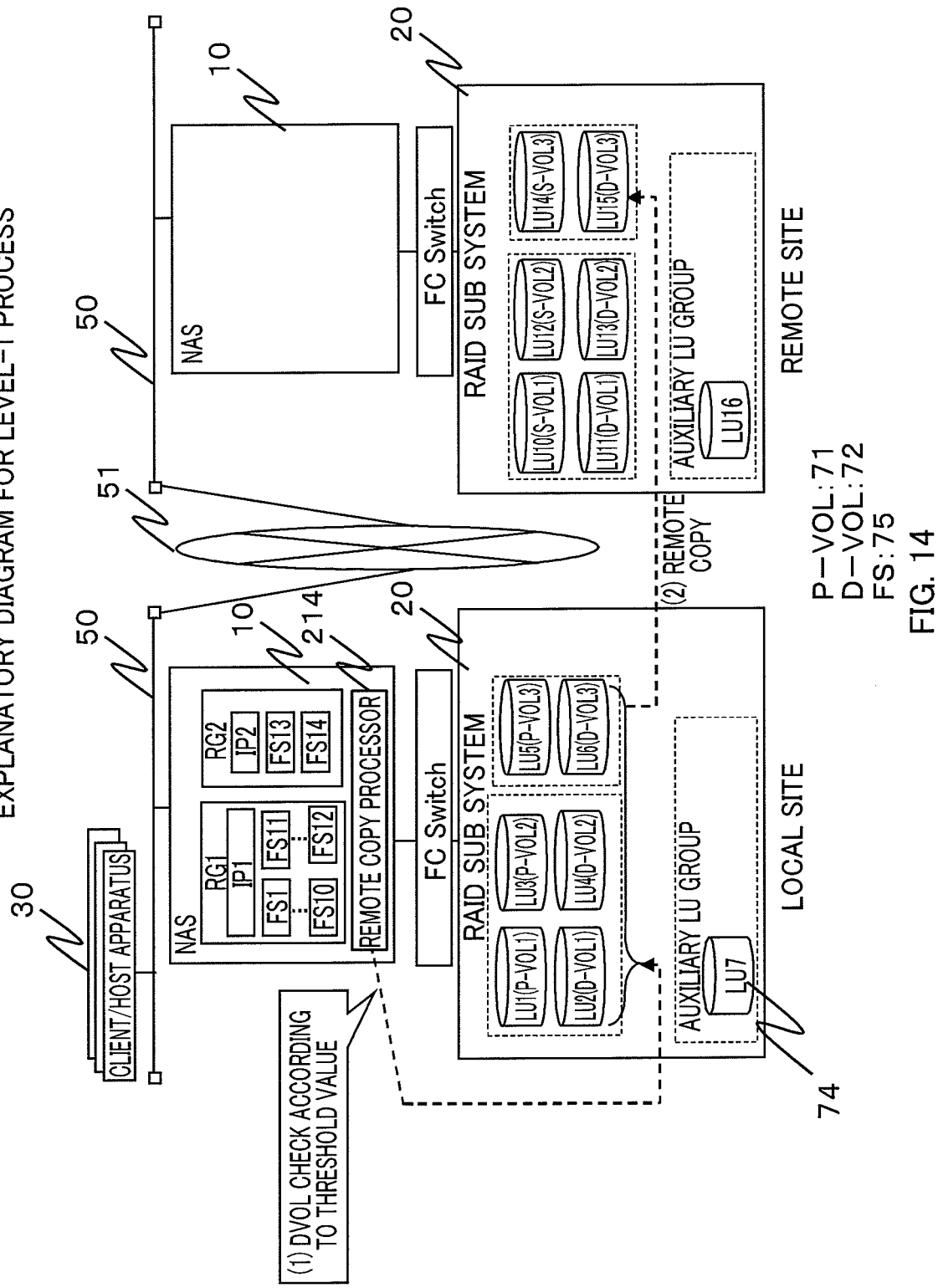
FIG. 14 is a schematic diagram for explaining the process corresponding to level 1.

FIG. 13 shows a process flow of an RG level-dependent process depending on an RG level determined in the remote copy response processor 2142. The process flow includes pre-processing depending on an RG level, the pre-processing corresponding to a process in which the contents of a remote copy process is changed based on an RG level determination result performed therebefore. The process flow also includes a process to be performed following the case where the RG level is determined to be 1. For better understanding, the contents of level 1 process are described along with its schematic explanatory diagram shown in FIG. 14.

In the level 1 process, until the capacity of D-VOL 72 used by the RG is used up (until the remaining capacity becomes not greater than a certain threshold value), a remote copy process is performed. Here, the remote copy process may be configured to be performed on a single D-VOL repetitively used (wrap-around) by performing overwriting thereon, and the remote copy process may be aborted after the D-VOL is repetitively used for a predetermined number of times.

After starting the process, the remote copy response processor 2142 acquires, from the RG management table 600, the present level 602, recorded therein, on an RG on which a remote copy process is requested, and determines whether the level of an acquired RG is 1 (S1301). When the RG level is not 1 (No in S1301), the remote copy response processor 2142 determines whether the RG level is 2 (S1309) or 3 (S1311). When the RG level corresponds to anyone of the levels (Yes in S1309 or S1311), remote copy processes corresponding respectively to these levels are performed (S1310 or S1312), and thereafter the process is terminated.

Incidentally, when it is determined that the acquired present level corresponds to none of the levels 1 to 3, there is a possibility that a certain trouble occurs such as an abnormality on the recording of the RG management table 600. Accordingly, the incorporating of a process is considered in which the ongoing process is passed to another functional block of the server apparatus 10 and give a user a warning notice.

When the RG level is determined to be 1 (Yes in S1301), the remaining capacity of D-VOL 72 used by the RG is calculated. The remaining capacity of D-VOL 72 is calculated with reference to the file system name 606 recorded on the RG management table 600, and a remaining capacity 704 of each file system of D-VOL 72 recorded on the file system management table 700.

In the process corresponding to the level 1, the contents of the remote copy process to be performed are changed depending on the calculated remaining capacity of D-VOL 72. In other words, three threshold values corresponding to the remaining capacity of D-VOL 72, that is, first to third threshold values are set in advance into a processing program as data, and depending on a comparison result between these threshold values and the calculated remaining capacity of D-VOL 72, a corresponding remote copy process is performed. In addition, in this embodiment, remaining capacity of D-VOL 72 in each of the threshold values is set so that the remaining capacities thereof decrease in order of the first to third threshold values (threshold values B to D) while not limited thereto, and several threshold values may be set in a suitable manner.

First, the remote copy response processor 2142 determines whether the calculated remaining capacity of D-VOL 72 is not larger than the first threshold value and is larger than the second threshold value, and when it is determined (Yes in S1303) that the calculated remaining capacity of D-VOL 72 is not larger than the second threshold value and is larger than the first threshold value, the remote copy response processor 2142 outputs, to a user through an output device 105 or the like, a warning message indicating that the remaining capacity of D-VOL 72 is running out (S1304). In this case, a remote copy process on the RG is performed in the usual manner.

When it is determined (No in S1303) that the calculated remaining capacity of D-VOL 72 is not larger than the first threshold value and is larger than the second threshold value, the remote copy response processor 2142 thereafter determines whether the calculated remaining capacity of D-VOL 72 is not larger than the second threshold value and is larger than the third threshold value. When it is determined (Yes in S1304) that the calculated remaining capacity of D-VOL 72 is not larger than the second threshold value and is larger than the third threshold value, the remote copy response processor 2142 deletes part of data from D-VOL 72 in which the snapshots are recorded, so as to increase the remaining capacity of D-VOL 72, and outputs a warning message indicating the delete of part of data of D-VOL 72 to the user through the output device 105 or the like (S1306). In this case, also, a remote copy process on the RG is performed in the usual manner. In addition, to increase the remaining capacity, it is preferable to suitably determine in advance and set which one of snapshots data are to be deleted (e.g., from a new snapshot or from an old snapshot).

When it is determined (No in S1305) that the calculated remaining capacity of D-VOL 72 is not larger than the second threshold value and is larger than the third threshold value, the remote copy response processor 2142 thereafter determines whether the calculated remaining capacity of D-VOL 72 is not larger than the third threshold value. When it is determined (Yes in S1307) that the calculated remaining capacity of D-VOL 72 is not larger than the third threshold value, the remote copy response processor 2142 aborts the remote copy process on the RG, and outputs, to the user through the output device 105 or the like, a error message indicating that the remote copy process is aborted since the remaining capacity of D-VOL 72 is running out (S1304). In this case, also, a remote copy process on the RG is performed in the usual manner. In addition, to increase the remaining capacity, it is preferable to suitably determine in advance and set which one of snapshots data are to be deleted (e.g., from a new snapshot or from an old snapshot).

When it is determined that the remaining capacity of D-VOL 72 used by the RG does not correspond to any one of the above conditions (No in S1307), the remote copy response processor 2142 terminates the process corresponding to level 1.

By the process corresponding to the RG level 1, the capacity of D-VOL 72 can efficiently be used while continuing the remote copy process on the RG.

Figure 15:
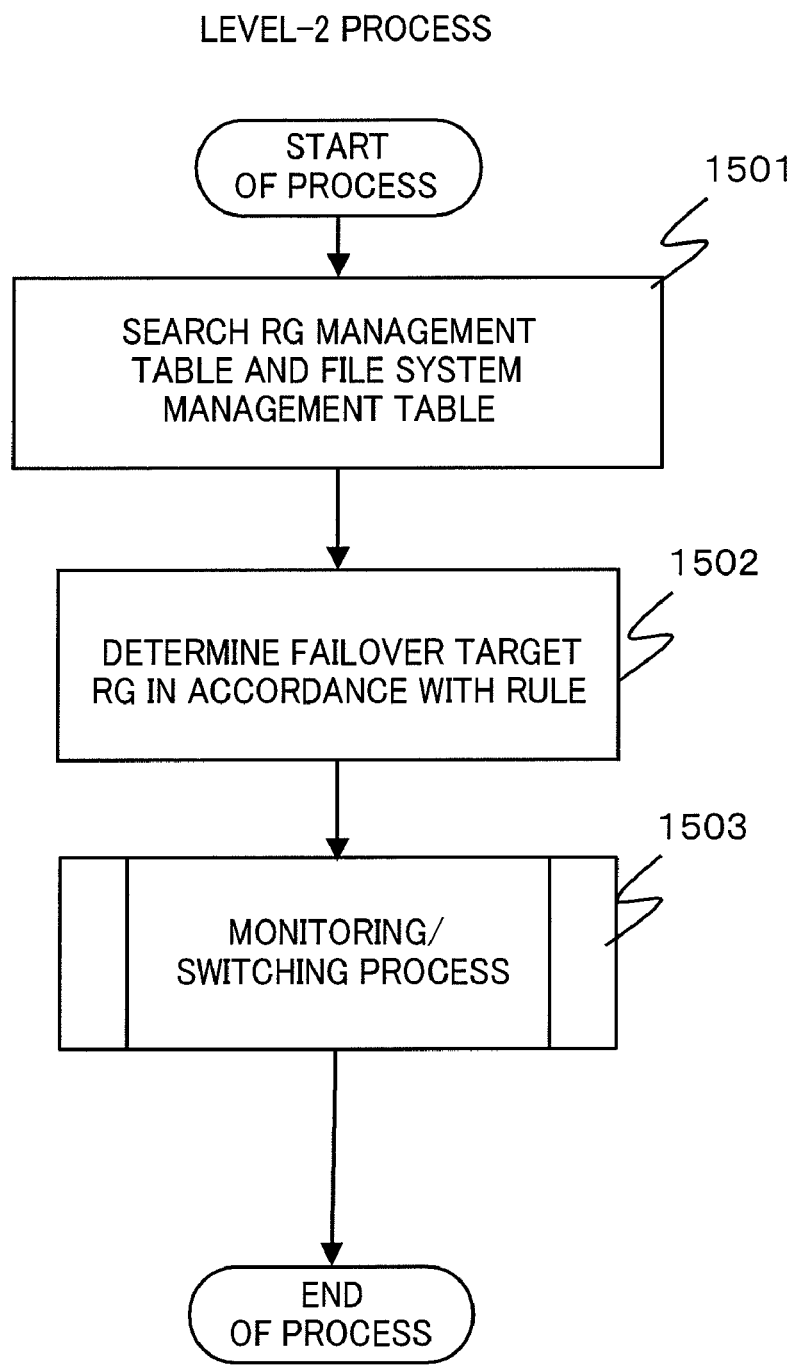
FIG. 15 is a flowchart for explaining a process corresponding to level 2.
Figures 16A, 16B:
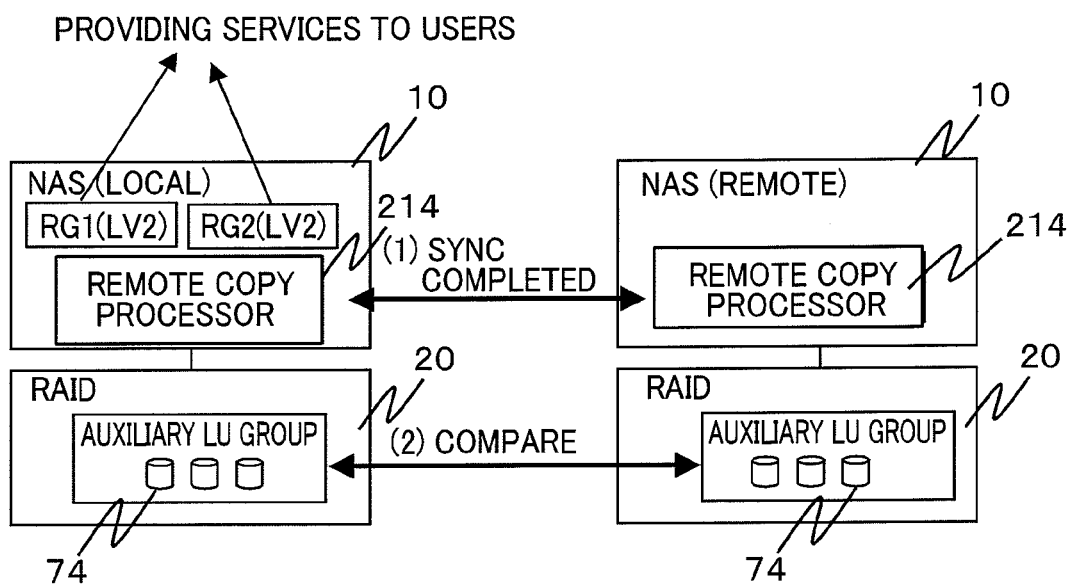
FIG. 16A is an example of a table used for selecting suitable RG as a target of a failover process among RGs of level 2.
FIG. 16B is a first schematic diagram for explaining the process corresponding to level 2.

Next, a process in the case where an RG is determined as level 2 is described. FIG. 15 shows a process flow performed in the case of level 2. For better understanding of the contents of the above process, FIGS. 16A and 16B show schematic explanatory diagrams representing the outline of the processes.

As shown in FIG. 13, when it is determined that an RG requested from the server apparatus 10 of the remote site is level 2, the remote copy response processor 2142 proceeds to a level-2 process (S1310) of FIG. 15.

First, the remote copy response processor 2142 searches the RG management table 600 and the file system management table 700 (S1501). At this time, the remote copy response processor 2142 extracts an RG which is determined that the present level 602 is level 2, acquires the remaining capacity of D-VOL 72 on each RG by referring to the file system management table 700, and acquires total time spent at level 3 and total time spent at level 2 from the total time spent at each level 604.

Acquisition results are sorted in ascending order of the remaining capacities of the D-VOL. When the remaining capacities of the D-VOL are equal to each other, the acquisition result having the larger total time spent at level 3 is ranked in higher position. When the total time spent at level 3 are equal to each other, the acquisition result having the smaller total time spent at level 2 is ranked in higher position. In this manner, in FIG. 16A, an example of a list on respective RGs acquired and sorted is shown.

The remote copy response processor 2142 determines a failover target RG by referring to the list (S1502). A determination procedure is as follows. First, a lower limit is provided in advance for the remaining capacities of D-VOL 72, and RGs with remaining capacities less than the lower limit are set as failover targets. Among target RGs, when there are a plurality of RGs with remaining capacities of D-VOL 72 equal to each other, an RG at higher position is determined based on the total times spent at levels 2 and 3, and determined as a failover target.

As described above, by providing a lower limit to the remaining capacities of D-VOL 72, RGs which run out of remaining capacities of D-VOL 72 after the failover process can be excluded. Further, RGs having a longer period of total time spent at level 3 are set to have higher priority. Accordingly a failover process is preferentially performed for the RGs with a longer period of time determined as important in the past. Further, when periods of total time spent at level 3 are equal to each other, an RG having the shorter period of total time spent at level 2 has higher priority. Accordingly, even when the determination level is temporarily changed from high position to low position (from level 3 to level 2), an RG is avoided from being estimated excessively low.

Subsequently, the remote copy response processor 2142 hands over (S1503) the process to the monitoring/switching processor 2151 of the failover processor 215, which actually performs a failover process, and terminates the process.

By performing the process corresponding to the level 2, the number of auxiliary volumes 74 on the primary side can be preferentially allocated, even when the numbers of auxiliary volumes 74 for each RG between the local and remote sites become unbalanced.

Figure 16C:
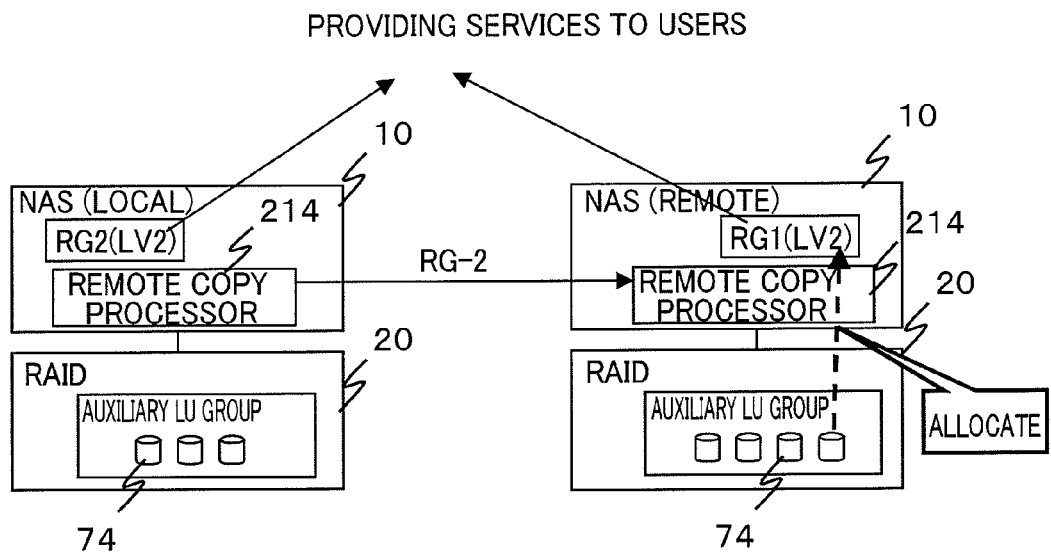
FIG. 16C is a second schematic diagram for explaining the process corresponding to level 2.
Figure 16D:
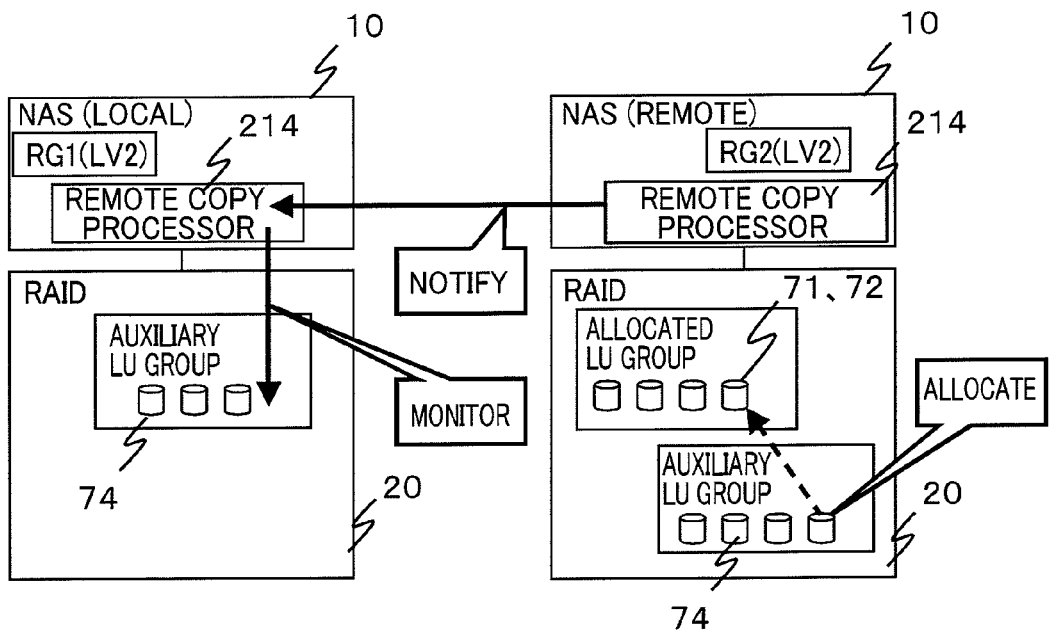
FIG. 16D is a third schematic diagram for explaining the process corresponding to level 2.
Figure 16E:
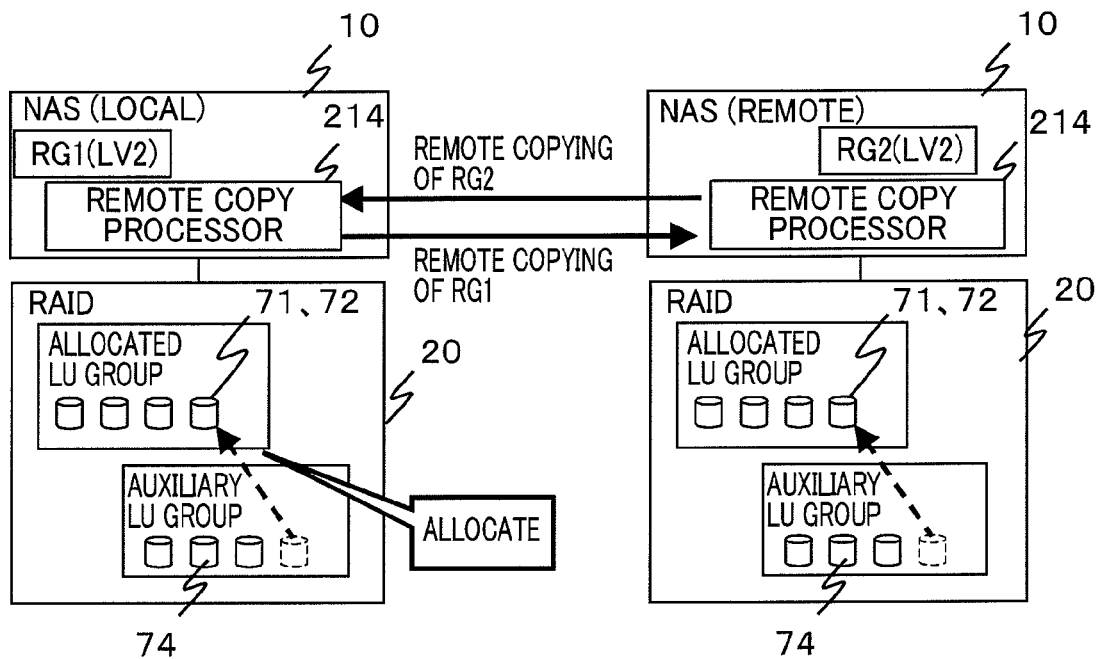
FIG. 16E is a fourth schematic diagram for explaining the process corresponding to level 2.

Incidentally, as shown in FIGS. 16C and 16D, after performing a failover process in accordance with a predetermined procedure, it may be configured to perform a process in which a volume is added from the auxiliary volumes 74 to D-VOLs 72. When extending D-VOL 72 in the above manner, priority of an RG is decreased in a search result of a process for selecting failover target RGs. Thus, this RG is excluded from being a failover target, and the chance of being a failover process target successively is decreased.

Figure 17:
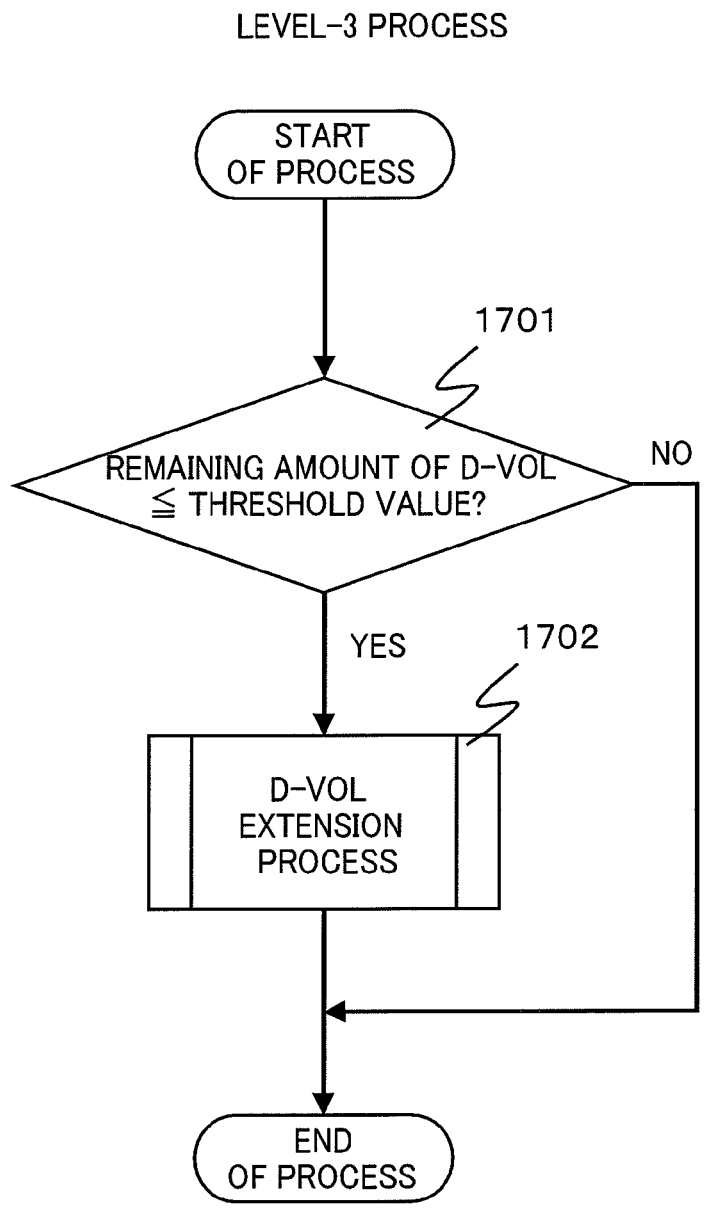
FIG. 17 is a flowchart for explaining a process corresponding to level 3.
Figure 19:
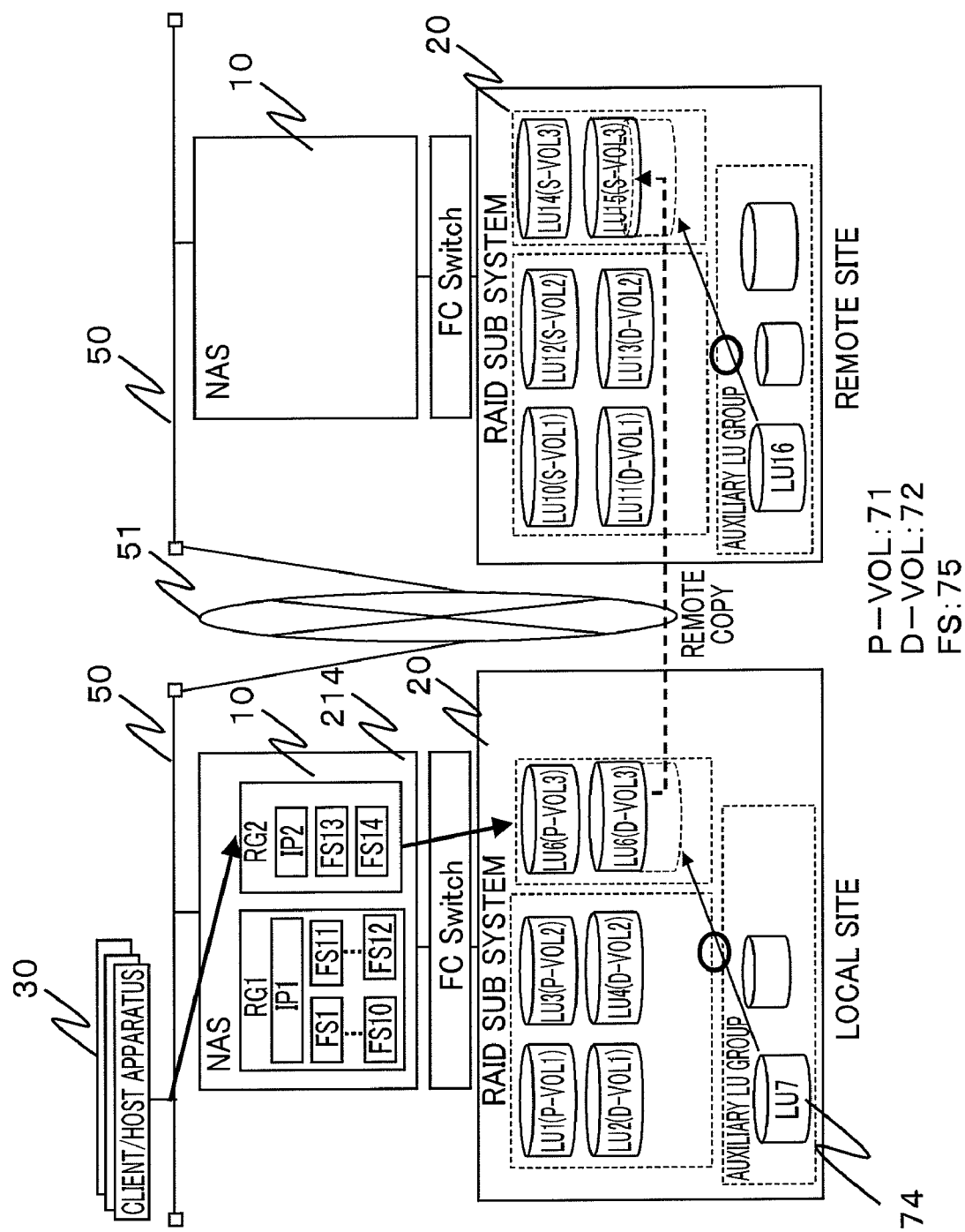
FIG. 19 is a schematic diagram for explaining the process corresponding to level 3.

Next, a process in the case where an RG is determined to be level 3 is described. FIG. 17 shows a process flow performed in the case of level 3. For better understanding of the contents of the above process, FIG. 19 shows a schematic explanatory diagram of the outline of the processes.

As shown in FIG. 13, when it is determined that an RG requested from the server apparatus 10 of the remote site is level 3, the remote copy response processor 2142 proceeds to a level-3 process (S1312 of FIG. 13) of FIG. 17.

First, the remote copy response processor 2142 acquires the remaining capacity of D-VOL 72 used by the RG with reference to the RG management table 600 and the file system management table 700 (S1700). Thereafter, the remote copy response processor 2142 compares the remaining capacity with a predetermined threshold value (a threshold value A), and when it is determined that the remaining capacity is not larger than the threshold value (Yes in S1701), the remote copy response processor 2142 proceeds to D-VOL extension process to be described later, in order to increase an allocation capacity of D-VOL 72, and terminates the process (S1702).

When it is determined that the acquired remaining capacity is larger than the threshold (No in S1701), the remote copy response processor 2142 determines that an increase of the capacity of D-VOL 72 is not necessary, and terminates the process.

According to the level 3 process, for an RG determined to be of high importance, it is possible to secure sufficient capacity of D-VOL 72 for the remote copy process.

==D-VOL Extension Process==

Figure 18A:
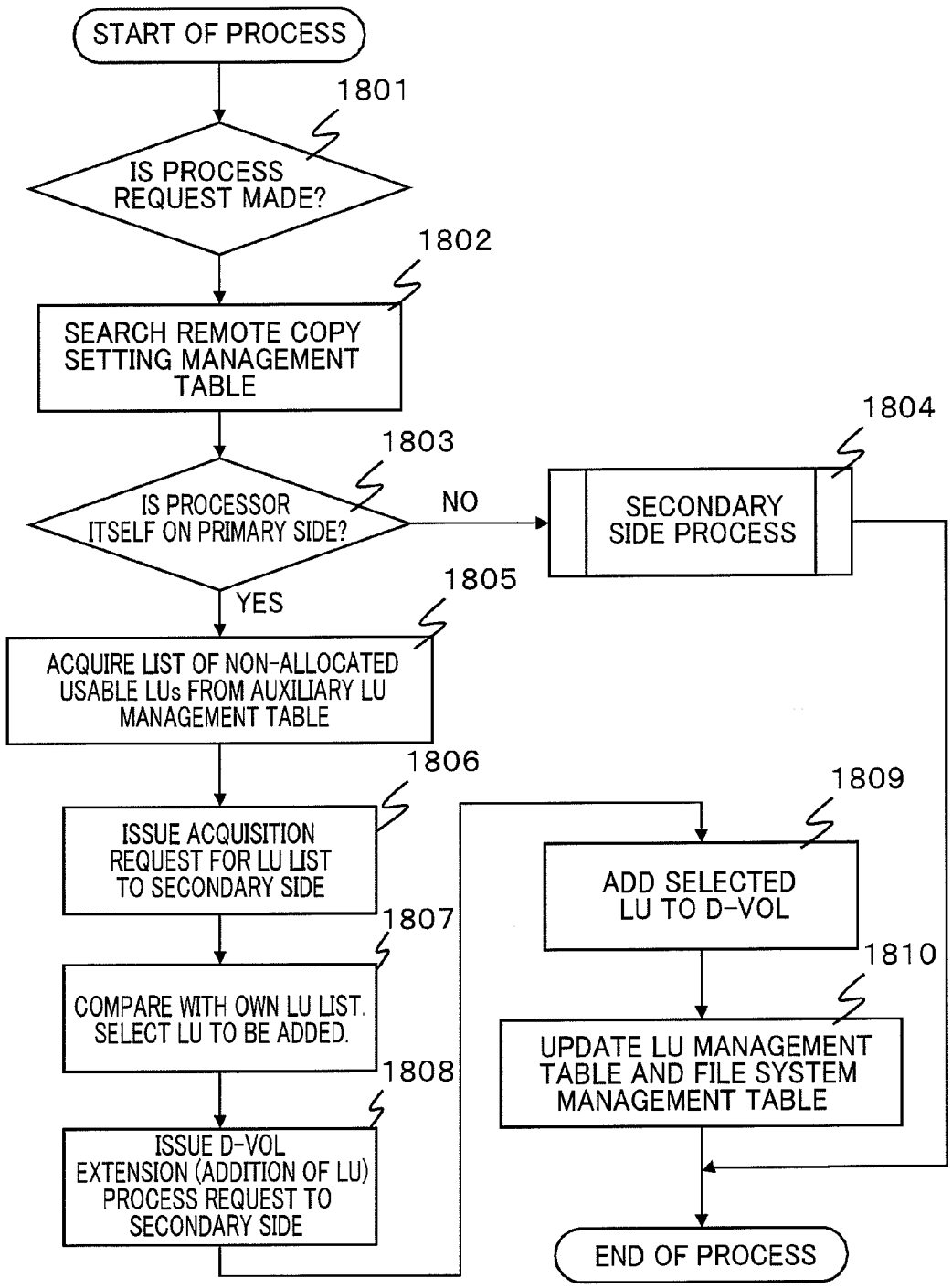
FIG. 18A is a flowchart for explaining a D-VOL extending process on a primary side.
Figure 18B:
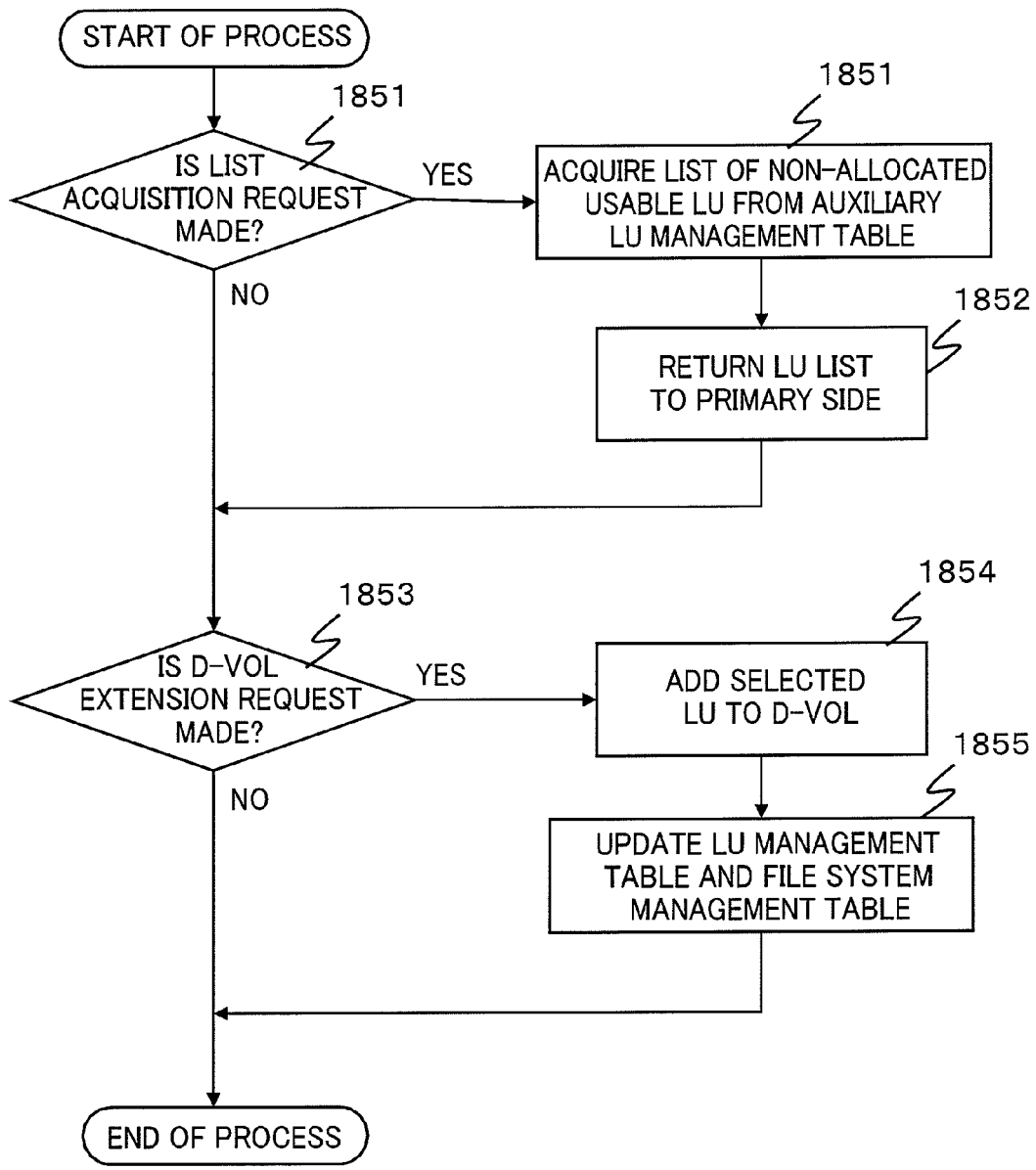
FIG. 18B is a flowchart for explaining a D-VOL extending process on a secondary side.

FIGS. 18A and 18B show process flows by D-VOL extension processors 2131 started when a predetermined condition holds true in the process flow at level 3. These processes are performed by each of the D-VOL extension processors 2131 in the remote copy processors 214 of server apparatuses 10. The processes are performed between server apparatuses 10, in combination, in which there are a primary side RG and a secondary side RG. FIG. 18A shows the process flow on the primary side, while FIG. 18B shows the process flow on the secondary side. Incidentally, as described with respect to the level 2 process, this D-VOL extension process is applicable to a configuration in which, after a failover process in the level 2 process, a process for adding a volume to D-VOL 72 from the auxiliary volumes 74 is performed.

First, the D-VOL extension process on the primary side is described with reference to FIG. 18A. The D-VOL extension processor 2131 waits (No in S1801) for a process request from the remote copy response processor 2142, and once acquiring the process request (Yes in S1801), the D-VOL extension processor 2131 searches the remote copy setting management table 900 (S1803) and determines (S1803) whether the processor itself is on a primary side 902 from the records of items on the primary side 902 and a secondary side 903.

When determining that the processor itself is not on the primary side 902 (No in S1803), the D-VOL extension processor 2131 proceeds to the process on the secondary side 903 to be described later (S1804).

When determining that the processor itself is on the primary side 902 (Yes in S1803), the D-VOL extension processor 2131 acquires all auxiliary volume names 801 (S1805) which are usable as D-VOL 72 and are in non-allocated state, with reference to the auxiliary volume management table 800 held by the own server apparatus 10. Next, the D-VOL extension processor 2131 issues a request (S1806) to the D-VOL extension processor 2131 in the server apparatus 10 on the secondary side to acquire an auxiliary volume name 801 with reference to the auxiliary volume management table 800.

Next, after receiving the acquired auxiliary volume name 801 from the secondary side, the D-VOL extension processor 2131 compares the auxiliary volume name 801 thus received and the auxiliary volume names 801 which the processor itself has acquired, and determines an auxiliary volume 74 to be added as D-VOL 72. In this embodiment, for the auxiliary volume 74 to be added, an auxiliary volume 74 having the largest and same capacity as the auxiliary volume 74 of the primary side is selected. The reason for this is to extend D-VOL 72 as much as possible and not to cause the capacities of D-VOLs 72 to be unbalanced between on the primary side and on the secondary side.

The D-VOL extension processor 2131 requests (S1808) the D-VOL extension processor 2131 on the secondary side to add the auxiliary volume 74 thus selected to D-VOL 72 so that the D-VOL 72 is extended. In addition, the D-VOL extension processor 2131 also adds the selected auxiliary volume 74 to its own D-VOL 72 (S1809), records "Allocated" on a corresponding allocated state of the auxiliary volume management table 800, and performs an update to change the D-VOL name, the assigned volume name 703 and the D-VOL remaining capacity 704 of the file system management table 700, and thereafter terminates the process (S1810).

Next, the D-VOL extension process on the secondary side is described with reference to FIG. 18B. The D-VOL extension processor 2131 on the secondary side determines (S1851) whether an acquisition request for the list of auxiliary volumes 74 is made from the primary side, and when acquiring the request (Yes in S1851), the D-VOL extension processor 2131 on the secondary side searches the auxiliary volume management table 800 of its own, acquires (S1852) an auxiliary volume name 801 which is in non-allocated state and usable as D-VOL 72, and transmits this to the D-VOL extension processor 2131 on the primary side (S1853).

Next, the D-VOL extension processor 2131 determines whether a request for a D-VOL extension process is made from the D-VOL extension processor 2131 on the primary side (S1854). When the request is made (Yes in S1854), the D-VOL extension processor 2131 adds, to D-VOL 72, an auxiliary volume 74 selected by the D-VOL extension processor 2131 on the primary side (S1855), records "Allocated" on a corresponding allocated state of the auxiliary volume management table 800 of its own, and performs an update to change the D-VOL name, the assigned volume name 703 and the D-VOL remaining capacity 704 of the file system management table 700, and thereafter terminates the process (S1856).

==Monitoring/Switching Process==

Figure 20A:
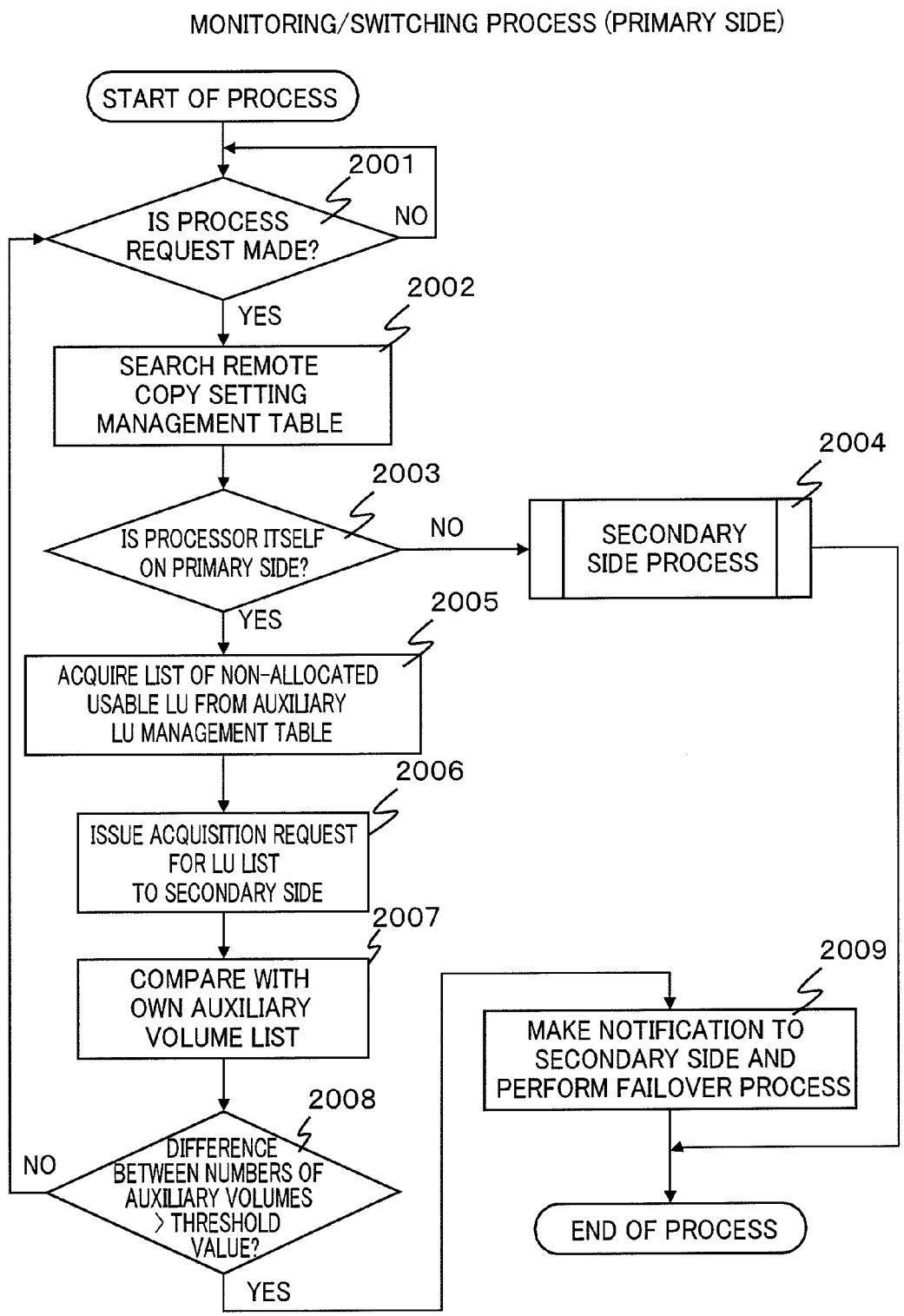
FIG. 20A is a flowchart for explaining a monitoring/switching process on the primary side.
Figure 20B:
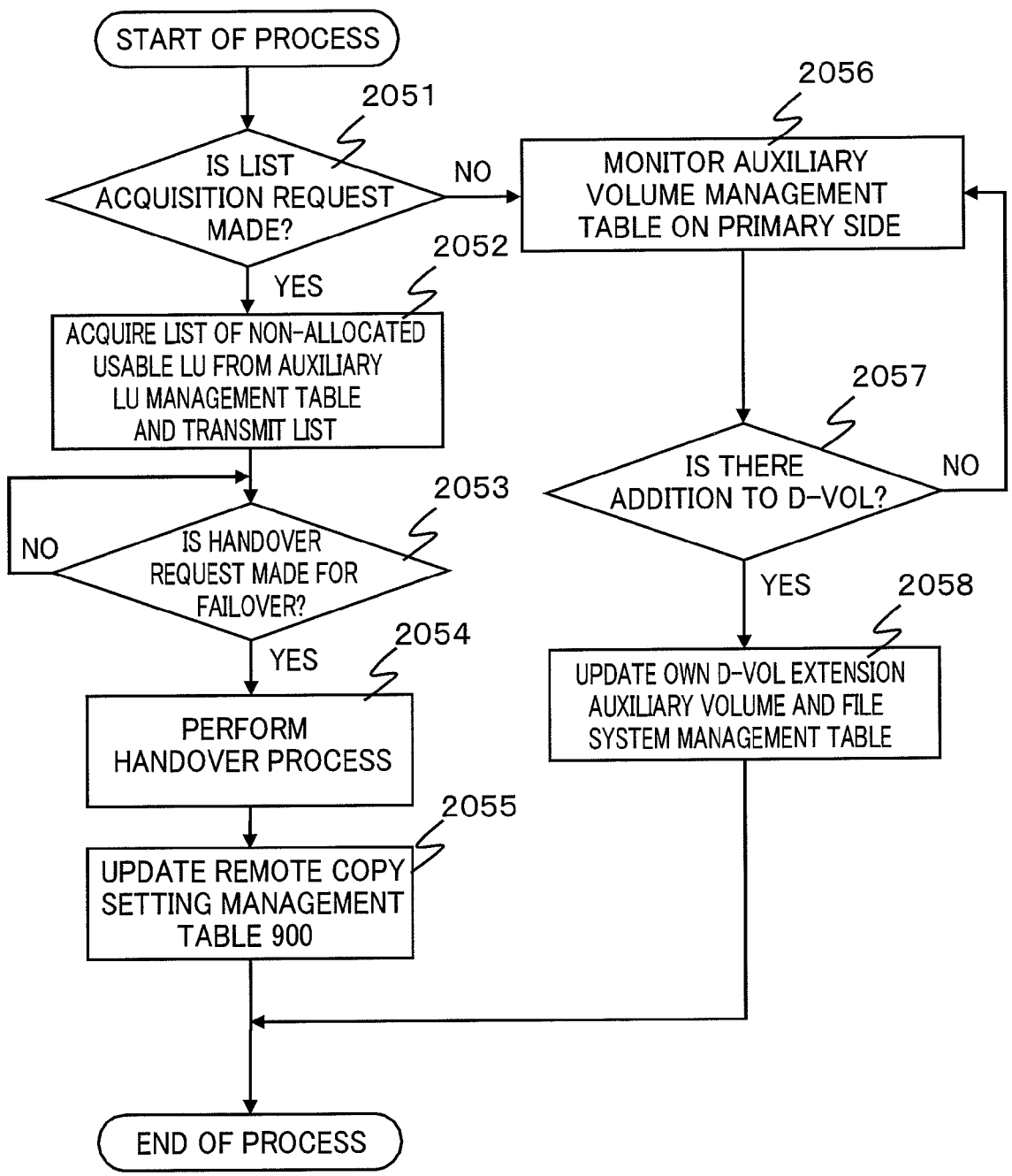
FIG. 20B is a flowchart for explaining a monitoring/switching process on the secondary side.

FIGS. 20A and 20B show process flows performed by the monitoring/switching processor 2151 of the failover processor 215 in each server apparatus 10 of the local site and the remote site. In this process, the monitoring/switching processor 2151 monitors the numbers of auxiliary volumes 74 between the server apparatuses 10 on the local and remote sites, and when a predetermined condition holds true, performs a failover process, for each RG, between the server apparatuses 10 on the local and remote sites. This monitoring/switching process is performed between the server apparatuses 10, in combination, in which there are a primary side RG and a secondary side RG. FIG. 20A shows a process flow on the primary side, while FIG. 20B shows a process flow on the secondary side.

First, the monitoring/switching process on the primary side is described with reference to FIG. 20A. The monitoring/switching processor 2151 waits (No in S2001) for a process request from the remote copy response processor 2142, and when acquiring the process request (Yes in S2001), the monitoring/switching processor 2151 searches the remote copy setting management table 900 (S2002) and determines (S2003) whether the processor itself is on a primary side 902 from the records of items on the primary side 902 and a secondary side 903.

When it is determined that the processor itself is not on the primary side 902 (No in S1803), the monitoring/switching processor 2151 proceeds to the process on the secondary side 903 to be described later (S2004).

When it is determined (Yes in S2003) that the processor itself is on the primary side 902, the monitoring/switching processor 2151 acquires (S2005) all auxiliary volume names 801 which are usable as D-VOL 72 and are in non-allocated state, with reference to the auxiliary volume management table 800 included in the server apparatus 10 of its own. Next, the monitoring/switching processor 2151 issues a request (S2006) to the monitoring/switching processor 2151 in the server apparatus 10 on the secondary side to acquire an auxiliary volume name 801 with reference to the auxiliary volume management table 800.

Next, a remote copy process is regularly performed between the server apparatuses 10 on the local and remote sites, and once snapshots are synchronized between these server apparatuses 10, the monitoring/switching processor 2151 receives the acquired auxiliary volume names 801 from the secondary side, compares these auxiliary volume names 801 with the auxiliary volume names 801 which the processor itself has acquired, and a difference in the numbers of auxiliary volumes 74 between the local site and remote site is calculated. The monitoring/switching processor 2151 compares the calculated difference in the numbers of auxiliary volumes 74 between the local and remote sites and a predetermined threshold. When it is determined (Yes in S008) that the difference is larger than the threshold and that the number of auxiliary volumes 74 on the secondary side is larger, the monitoring/switching processor 2151 notifies this result to the server apparatus 10 on the secondary side, thereafter, performs a failover process, and terminates the process (S2009).

Next, the monitoring/switching process on the secondary side is described with reference to FIG. 20B. The monitoring/switching processor 2151 on the secondary side determines (S2051) whether an acquisition request for the list of auxiliary volumes 74 is made from the primary side, and when acquiring the request (Yes in S2051), the monitoring/switching processor 2151 on the secondary side searches the auxiliary volume management table 800 of its own, acquires an auxiliary volume name 801 which is in non-allocated state and usable as D-VOL 72, and transmits this to the monitoring/switching processor 2151 on the primary side (S2052).

The monitoring/switching processor 2151 determines (S2053) whether a handover process request following the performing of a failover process is made from the monitoring/switching processor 2151 on the primary side. When the request is made (Yes in S2053), the monitoring/switching processor 2151 performs a handover process (S2054), and updates a remote copy setting management table 900 of its own, and terminates the process (S2055).

When no acquisition request for the list of auxiliary volumes 74 is made from the primary side (No in S2051), the monitoring/switching processor 2151 on the secondary side monitors (S2056) the auxiliary volume management table

800 on the primary side, and determines (S2057) whether an auxiliary volume 74 is added. When the auxiliary volume 74 is added as D-VOL 72 (Yes in S2057), the monitoring/switching processor 2151 also adds a corresponding auxiliary volume 74 in the server apparatus 10 of its own, and updates the auxiliary volume management table 800 and the file system management table 700 of its own, and thereafter terminates the process (S2058).

As described above in detail, according to the embodiment of the present invention, an advantage is produced in which the remote copy process for snapshot difference data are securely continued while efficiently using storage areas in a copy source and a copy destination.

What is claimed is:

1. An information processing apparatus coupled to a storage apparatus providing a plurality of logical volumes, comprising:
    a file system managing the plurality of logical volumes by allocating the plurality of logical volumes to each P-VOL, each D-VOL and auxiliary volumes that are each additionally allocatable as the D-VOL, the file system being capable of accessing the each P-VOL, the P-VOL used for data input/output with an external device, the D-VOL used for storing difference data generated with update of data in the P-VOL to reproduce a snapshot that is a state of the P-VOL at a certain time;
    a communication interface with which the external device communicates with the file system;
    a data copying processing part implemented through executing a corresponding program by a processor of the information processing apparatus, that copies, at predetermined time intervals, the difference data of the D-VOL onto a different D-VOL disposed outside of the storage apparatus via the communication interface; and
    a failover processing part implemented through executing a corresponding program by a processor of the information processing apparatus, that acquires the number of other auxiliary volumes provided to be added to the different D-VOL as a new D-VOL when the data copying processing part completes a process of copying the difference data of the D-VOL onto the different D-VOL, comparing the acquired number of the other auxiliary volumes with the number of auxiliary volumes of its own, and
    performs a failover process of switching a function of a copy source in the data copying process by the data copying processing part, to a function of a copy destination thereof when the failover processing part determines that the acquired number of the other auxiliary volumes is larger than the number of auxiliary volumes of its own by a predetermined threshold value or more;
    wherein:
    the process of each of the data copying processing part and the failover processing part is performed in unit of a group of logical volumes which are used by the file system corresponding to each network address allocated in a communication network;
    logical volume groups used by the file system and corresponding to the respective network addresses are classified into different importance levels in accordance with a predetermined reference value, and
    the logical volume groups are subjected to different processing contents in the data copying and failover processes depending on the importance levels into which the groups are classified, with the different processing for each level being:
    Level 1: the D-VOL is repeatedly used while allowing overwriting and the remote copying is stopped when the capacity of the D-VOL is completely consumed;
    Level 2: the failover process is carried out to a site with more auxiliary volumes, and the remote copying is continued; and
    Level 3: the capacity of D-VOL is secured and the remote copying is continued.

2. The information processing apparatus according to claim 1,
    wherein if the failover processing part determines that the number of auxiliary volumes of its own is larger than a predetermined value when the failover process is complete, the failover processing part selects an auxiliary volume from the auxiliary volumes included in itself in accordance with a predetermined procedure, newly adds the auxiliary volume as a D-VOL, and transmits information of the addition to the information processing apparatus as a new copy source.

3. The information processing apparatus according to claim 1,
    wherein the predetermined reference value applied to classify the logical volume groups into the different levels includes any of the number of users of each of the network addresses corresponding to the respective logical volume groups, the number of file systems corresponding to each of the logical volume groups, and the number of communication ports allocated to each of the network addresses.

4. The information processing apparatus according to claim 1,
    wherein, if the data copying processing part determines one of the logical volume groups used by the file systems and corresponding to the respective network addresses as highest at the importance level in accordance with the predetermined reference value, the data copying processing part acquires the remaining capacity of the D-VOL included in the one logical volume group and compares the remaining capacity with a predetermined threshold value A, and
    when the data copying processing part determines the acquired remaining capacity of the D-VOL as not larger than the predetermined threshold value A, the data copying processing part newly adds an auxiliary volume included in the logical volume group as a D-VOL.

5. The information processing apparatus according to claim 1,
    wherein, if the data copying processing part determines one of the logical volume groups used by the file systems and corresponding to the respective network addresses as lowest at the importance level in accordance with the predetermined reference value, the data copying processing part acquires the remaining capacity of the D-VOL included in the one logical volume group and compares the remaining capacity with a predetermined threshold value B, and
    when the data copying processing part determines the acquired remaining capacity of the D-VOL as not larger than the predetermined threshold value B, the data copying processing part aborts the data copying process on the one logical volume group.

6. The information processing apparatus according to claim 5,
    wherein a threshold value C larger than the predetermined threshold value B is further set for the remaining capacity of the D-VOL, the data copying processing part acquires the remaining capacity of the D-VOL included in the one logical volume group and compares the remaining capacity with the predetermined threshold values B and C, and when the data copying processing part determines the acquired remaining capacity of the D-VOL as larger than the threshold value B but as not larger than the predetermined threshold value C, the data copying processing part deletes part of data recorded on the D-VOL, and performs the data copying process for the one logical volume group.

7. The information processing apparatus according to claim 6, wherein a threshold value D larger than the predetermined threshold value C is further set for the remaining capacity of the D-VOL, the data copying processing part acquires the remaining capacity of the D-VOL included in the one logical volume group and compares the remaining capacity with the predetermined threshold values C and D, and when the data copying processing part determines the acquired remaining capacity of the D-VOL as larger than the threshold value C but as not larger than the predetermined threshold value D, the data copying processing part performs the data copying process for the one logical volume group, and outputs information indicating that the remaining capacity of the D-VOL is running out.

8. An operation method for an information processing apparatus coupled to a storage apparatus providing a plurality of logical volumes, the information processing apparatus including:

a file system managing the plurality of logical volumes by allocating the plurality of logical volumes to each P-VOL, each D-VOL and auxiliary volumes that are each additionally allocatable as the D-VOL, the file system being capable of accessing the each P-VOL, the P-VOL used for data input/output with an external device, the D-VOL used for storing difference data generated with update of data in the P-VOL to reproduce a snapshot that is a state of the P-VOL at a certain time;

a communication interface with which the external device communicates with the file system; and a data copying processing part and a failover processing part implemented by executing a program by a processor of the information processing apparatus, the operation method comprising:

copying implemented by the data copying processing part that copies, at predetermined time intervals, the difference data of the D-VOL onto a different D-VOL disposed outside of the storage apparatus via the communication interface; and acquiring implemented by the failover processing part that acquires the number of other auxiliary volumes provided to be added to the different D-VOL as a new D-VOL when the copying of the difference data of the D-VOL onto the different D-VOL is complete, comparing the acquired number of other auxiliary volumes with the number of auxiliary volumes of its own, and performing a failover process of switching a function of a copy source of the data copying process in the copying the difference data, to a function of a copy destination thereof when the acquired number of the other auxiliary volumes is larger than the number of auxiliary volumes of its own by a predetermined threshold value or more;

wherein:

the process of each of the data copying processing part and the failover processing part is performed in unit of a group of logical volumes which are used by the file system corresponding to each network address allocated in a communication network;

logical volume groups used by the file system and corresponding to the respective network addresses are classified into different importance levels in accordance with a predetermined reference value, and the logical volume groups are subjected to different processing contents in the data copying and failover processes depending on the importance levels into which the groups are classified, with the different processing for each level being:

Level 1: the D-VOL is repeatedly used while allowing overwriting and the remote copying is stopped when the capacity of the D-VOL is completely consumed;

Level 2: the failover process is carried out to a site with more auxiliary volumes, and the remote copying is continued; and Level 3: the capacity of D-VOL is secured and the remote copying is continued.

9. An information processing apparatus coupled to a storage apparatus providing a plurality of logical volumes, comprising:

a file system managing the plurality of logical volumes by allocating the plurality of logical volumes to each P-VOL, each D-VOL and auxiliary volumes that are each additionally allocatable as the D-VOL, the file system being capable of accessing the each P-VOL, the P-VOL used for data input/output with an external device, the D-VOL used for storing difference data generated with update of data in the P-VOL to reproduce a snapshot that is a state of the P-VOL at a certain time;

a communication interface with which the external device communicates with the file system;

a data copying processing part implemented through executing a corresponding program by a processor of the information processing apparatus, that copies, at predetermined time intervals, the difference data of the D-VOL onto a different D-VOL disposed outside of the storage apparatus via the communication interface; and a failover processing part implemented through executing a corresponding program by a processor of the information processing apparatus, that acquires the number of other auxiliary volumes provided to be added to the different D-VOL as a new D-VOL when the data copying processing part completes a process of copying the difference data of the D-VOL onto the different D-VOL, comparing the acquired number of the other auxiliary volumes with the number of auxiliary volumes of its own, and performs a failover process of switching a function of a copy source in the data copying process by the data copying processing part, to a function of a copy destination thereof when the failover processing part determines that the acquired number of the other auxiliary volumes is larger than the number of auxiliary volumes of its own by a predetermined threshold value or more;

wherein:

the process of each of the data copying processing part and the failover processing part is performed in unit of a group of logical volumes which are used by the file system corresponding to each network address allocated in a communication network;

logical volume groups used by the file system and corresponding to the respective network addresses are classified into different importance levels in accordance with a predetermined reference value, and the logical volume groups are subjected to different processing contents in the data copying and failover processes depending on the importance levels into which the groups are classified, with the different processing for each level being:

Level 1: the D-VOL is repeatedly used while allowing overwriting and the remote copying is stopped after the D-VOL is repetitively used for a predetermined number of times;

Level 2: the failover process is carried out to a site with more auxiliary volumes, and the remote copying is continued; and Level 3: the capacity of D-VOL is secured and the remote copying is continued.

* * * * *